US010902149B2

(12) United States Patent
Ding et al.

(10) Patent No.: US 10,902,149 B2
(45) Date of Patent: Jan. 26, 2021

(54) REMOTE TESTING ANALYSIS FOR SOFTWARE OPTIMIZATION BASED ON CLIENT-SIDE LOCAL DIFFERENTIAL PRIVACY-BASED DATA

(71) Applicant: Microsoft Technology Licensing, LLC, Redmond, WA (US)

(72) Inventors: Bolin Ding, Redmond, WA (US); Harsha Prasad Nori, Bellevue, WA (US); Paul Luo Li, Redmond, WA (US); Joshua Stanley Allen, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 196 days.

(21) Appl. No.: 15/928,935

(22) Filed: Mar. 22, 2018

(65) Prior Publication Data
US 2019/0236306 A1    Aug. 1, 2019

Related U.S. Application Data

(60) Provisional application No. 62/625,323, filed on Feb. 1, 2018.

(51) Int. Cl.
*G06F 21/00* (2013.01)
*G06F 21/62* (2013.01)
(Continued)

(52) U.S. Cl.
CPC ...... *G06F 21/6245* (2013.01); *G06F 11/3006* (2013.01); *G06F 11/3452* (2013.01);
(Continued)

(58) Field of Classification Search
CPC ............. G06F 21/6245; G06F 21/6254; G06F 11/3672; G06F 11/3006; G06F 11/3452;
(Continued)

(56) References Cited

U.S. PATENT DOCUMENTS 6,317,468 B1 * 11/2001 Meyer ................... H03B 28/00
375/269
8,316,237 B1    11/2012 Felsher et al.
(Continued)

OTHER PUBLICATIONS

Agrawal et al, "A Framework for High-Accuracy Privacy-Preserving Mining", In Proceedings of the 21st International Conference on Data Engineering (ICDE), 2005, 12 pages.
(Continued)

*Primary Examiner* — John B King
(74) *Attorney, Agent, or Firm* — Fiala & Weaver P.L.L.C.

(57) ABSTRACT

Methods, systems, apparatuses, and computer-readable storage medium are described herein for remotely analyzing testing results based on LDP-based data obtained from client devices in order to determine an effect of a software application with respect to its features and/or the population in which the application is tested. The analysis is based on a series of statistical computations for conducting hypothesis tests to compare population means, while ensuring LDP for each user. For example, an LDP scheme is used on the client-side that privatizes a measured value corresponding to a usage of a resource of the client. A data collector receives the privatized data from two sets of populations. Each population's clients have a software application that may differ in terms of features or user group. The privatized data received from each population is analyzed to determine an effect of the difference between the software applications of the different populations.

20 Claims, 6 Drawing Sheets

(51) Int. Cl.
  G06F 11/36     (2006.01)
  H04L 12/24    (2006.01)
  G06F 11/34    (2006.01)
  G06F 11/30    (2006.01)
(52) U.S. Cl.
  CPC ...... *G06F 11/3608* (2013.01); *G06F 11/3664* (2013.01); *G06F 11/3672* (2013.01); *G06F 21/6254* (2013.01); *H04L 41/142* (2013.01)
(58) Field of Classification Search
  CPC . G06F 11/3664; G06F 11/3608; H04L 41/142
  See application file for complete search history.

(56) References Cited

U.S. PATENT DOCUMENTS

| | | | |
|---|---|---|---|
| 9,363,087 | B2 | 6/2016 | Hawblitzel et al. |
| 9,536,093 | B2 | 1/2017 | Hawblitzel et al. |
| 10,504,154 | B1* | 12/2019 | Bonawitz ................ H04L 9/008 |
| 2009/0300312 | A1 | 12/2009 | Handschuh et al. |
| 2011/0007639 | A1* | 1/2011 | Richardson ........... H04W 8/005 370/252 |
| 2015/0058077 | A1 | 2/2015 | Buban et al. |
| 2015/0067343 | A1 | 3/2015 | Grobman |
| 2016/0171248 | A1 | 6/2016 | Nesher et al. |
| 2017/0353855 | A1* | 12/2017 | Joy ....................... H04W 12/02 |
| 2018/0255023 | A1 | 9/2018 | Whaley et al. |
| 2018/0307854 | A1 | 10/2018 | Bemau et al. |
| 2018/0336357 | A1* | 11/2018 | Nissim Kobliner .. G06F 21/602 |
| 2019/0073608 | A1 | 3/2019 | Veeningen |
| 2019/0141052 | A1 | 5/2019 | Nerurkar et al. |
| 2019/0147188 | A1 | 5/2019 | Benaloh et al. |

OTHER PUBLICATIONS

Apple, "IOS 10.0", © 2017, <https://developer.apple.com/library/content/releasenotes/General/whatsNewIniOS/Articles/iOS10.html>, 15 pages.
Avent et al., "BLENDER: Enabling Local Search with a Hybrid Differential Privacy Model", In 26th USENIX Security Symposium (USENIX Security), May 2, 2017, pp. 1-18.
Bassily et al., "Local, Private, Efficient Protocols for Succinct Histograms", In Proceedings of the 47th ACM Symposium on Theory of Computing (STOC) Apr. 18, 2015, pp. 127-135.
Bassily et al., "Practical Locally Private Heavy Hitters", CoRR abs/1707.04982, Jul. 16, 2017, pp. 1-32.
Ding et al., "Collecting Telemetry Data Privately", Advances in Neural Information Processing Systems 30 (NIPS), 2017, 10 pages.
Duchi et al., "Local Privacy and Statistical Minimax Rates", 2013, In 54th Annual IEEE Symposium on Foundations of Computer Science (FOCS), pp. 429-438.
Duchi et al., "Local Privacy and Minimax Bounds: Sharp Rates for Probability Estimation", Advances in Neural Information Processing Systems 26 (NIPS) May 26, 2013, pp. 1529-1537.
Duchi et al., "Minimax Optimal Procedures for Locally Private Estimation", Apr. 4, 2016, CoRR abs/1604.02390, 64 pages.
Dwork et al., "Calibrating Noise to Sensitivity in Private Data Analysis", In 3rd Theory of Cryptography Conference (TCC), 2006, 20 pages.
Erlingsson et al., "RAPPOR: Randomized Aggregatable Privacy-Preserving Ordinal Response", retrieved from <http://dx.doi.org/10.1145/2660267.2660348>, 2014, pp. 1054-1067.
Evfimievski et al., "Limiting Privacy Breaches in Privacy Preserving Data Mining", In Proceedings of the 22nd ACM Symposium on Principles of Database Systems (PODS), 2003, 12 pages.
Fanti et al., "Building a RAPPOR with the Unknown: Privacy-Preserving Learning of Associations and Data Dictionaries", Proceedings on Privacy Enhancing Technologies, 2016, pp. 41-61.
Fienberg et al., "Differential Privacy and the Risk-Utility Tradeoff for Multi-dimensional Contingency Tables", In Proceedings of Privacy in Statistical Databases (PSD), 2010, pp. 187-199.

Gaboardi et al., "Differentially Private Chi-Squared Hypothesis Testing: Goodness of Fit and Independence Testing", In Proceedings of the 33rd International Conference on Machine Learning, (ICML) 2016, pp. 2111-2120.
Greenberg, Andy, "Uber's New Tool Lets Its Staff Know Less About You" retrieved from <https://www.wired.com/story/uber-privacy-elastic-sensitivity/>, Jul. 13, 2017, 7 pages.
Hackett, R., "What to Know About the Ashley Madison Hack", retrieved from <http://fortune.com/2015/08/26/ashley-madison-hack/>, Aug. 26, 2015, 4 pages.
Johnson et al., "Privacy-Preserving Data Exploration in Genome-Wide Association Studies", In the 19th ACM SIGKDD International Conference of Knowledge Discovery and Data Mining (KDD) Aug. 2013, 25 pages.
Kairouz et al., "Discrete Distribution Estimation under Local Privacy", 2016, pp. 2436-2444.
Kairouz et al., "Extremal Mechanisms for Local Differential Privacy", In Advances in Neural Information Processing Systems 27 (NIPS), 2014, pp. 2879-2887.
Kakizaki et al., "Differentially Private Chi-squared Test by Unit Circle Mechanism", In Proceedings of the 34th International Conference on Machine Learning, 2017, 10 pages.
Karwa et al., "Differentially Private Graphical Degree Sequences and Synthetic Graphs", In Proceedings of Privacy in Statistical Databases (PSD), 2012, pp. 273-285.
Karwa et al., "Inference Using Noisy Degrees: Differentially Private β-model and Synthetic Graphs", The Annals of Statistics, Jan. 12, 2016, 28 pages.
Kohavi et al., "Front Line Internet Analytics at Amazon.com", Emetrics Summit, 2004, 31 pages.
Kohavi et al., "Trustworthy Online Controlled Experiments: Five Puzzling Outcomes Explained", 2012, In the 18th ACM SIGKDD International Conference on Knowledge Discovery and Data Mining (KDD), pp. 786-794.
McSherry, Frank, "Privacy Integrated Queries: An Extensible Platform for Privacy-Preserving Data Analysis", In Proceedings of the ACM SIGMOD International Conference on Management of Data (SIGMOD), 2009, pp. 19-30.
Panger, Galen, "Reassessing the Facebook Experiment: Critical Thinking About the Validity of Big Data Research", Information, Communication & Society 19(8), pp. 1108-1126, 2016.
Rogers, et al., "A New Class of Private Chi-Square Tests", In Proceedings of the 20th International Conference on Artificial Intelligence and Statistics (AISTATS), Oct. 26, 2016, 36 pages.
Rogers, Ryan M., "Leveraging Privacy in Data Analysis", Presented to the Faculties of the University of Pennsylvania in Partial Fulfillment of the Requirements for the Degree of Doctor of Philosophy, 226 pages, 2017.
Tang et al., "Overlapping Experiment Infrastructure: More, Better, Faster Experimentation", In Proceedings of the 16th ACM SIGKDD International Conference on Knowledge Discovery and Data Mining (KDD) 2010, pp. 17-26.
Uhler et al., Privacy-preserving data sharing for genome-wide association studies., The Journal of Privacy and Confidentiality 5(1), pp. 137-166, 2013.
Vu et al., "Differential Privacy for Clinical Trial Data: Preliminary Evaluations", In IEEE International Conference on Data Mining Workshops, 2009, 6 pages.
Wang et al., "Mutual Information Optimally Local Private Discrete Distribution Estimation", CoRR abs/1607.08015, 2016, 12 pages.
Wang et al., "Locally Differentially Private Protocols for Frequency Estimation", 26th USENIX Security Symposium, 2017, pp. 729-745.
Wang et al, "Differentially private hypothesis testing, revisited." CoRR abs/1511.03376, 2015, 53 pages.
Wang et al., "Using Randomized Response for Differential Privacy Preserving Data Collection", In Proceedings of the Workshops of the EDBT/ICDT 2016 Joint Conference (EDBT/ICDT Workshops), 8 pages.
Warner, L. Stanley, "Randomized Response: A Survey Technique for Eliminating Evasive Answer Bias", Journal of the American Statistical Association, Mar. 1965, pp. 63-69.

(56) References Cited

OTHER PUBLICATIONS

Yu et al., "Scalable Privacy-Preserving Data Sharing Methodology for Genome-Wide Association Studies", Journal of Biomedical Informatics 50, 2014, pp. 133-141.

"A/B Testing What Is A/B Testing? How A/B Testing Works", Retrieved from: https://web.archive.org/web/20171116021515/https://www.optimizely.com/optimization-glossary/ab-testing/, Nov. 16, 2017, 12 Pages.

"Cryptographic Library", Retrieved from: https://web.archive.org/web/20170901013316/https://software.intel.com/en-us/node/709061, Sep. 1, 2017, 2 Pages.

"Differential Privacy", Retrieved from: https://web.archive.org/web/20170830011945/https://en.wikipedia.org/wiki/Differential_privacy, Aug. 30, 2017, 7 Pages.

"Intel Software Guard Extensions Remote Attestation End-to-End Example", Retrieved from: http://web.archive.org/web/20180626223511/https://software.intel.com/en-us/articles/intel-software-guard-extensions-remote-attestation-end-to-end-example, Jul. 8, 2016, 13 Pages.

"Software Guard Extensions", Retrieved from: https://web.archive.org/web/20170928085307/https://en.wikipedia.org/wiki/Software_Guard_Extensions, Sep. 28, 2017, 3 Pages.

"Trusted Key Exchange Functions", Retrieved from: https://web.archive.org/web/20170911213919/https://software.intel.com/en-us/node/709062, Sep. 11, 2017, 1 Page.

Bittau, et al., "PROCHLO: Strong Privacy for Analytics in the Crowd", In Proceedings of the 26th Symposium on Operating Systems Principles, Oct. 28, 2017, 19 Pages.

Costan, et al., "Intel SGX Explained", In Journal IACR Cryptology ePrint Archive, vol. 86, Feb. 2016, 118 Pages.

Ding, et al., "Comparing Population Means under Local Differential Privacy: with Significance and Power", In Proceedings of the Thirty-Second AAAI Conference on Artificial Intelligence, Mar. 24, 2018, 8 Pages.

Dwork, et al., "The Algorithmic Foundations of Differential Privacy", In Foundations and Trends in Theoretical Computer Science, vol. 9, Issue 3-4, Aug. 11, 2014, 26 Pages.

Hardt, et al., "A Multiplicative Weights Mechanism for Privacy-Preserving Data Analysis", In Proceedings of 51st Annual IEEE Symposium on Foundations of Computer Science, Oct. 23, 2010, pp. 1-28.

Hawblitzel, et al., "Ironclad Apps: End-to-End Security via Automated Full-System Verification", In Proceedings of the 11th (USENIX) Symposium on Operating Systems Design and Implementation, Oct. 6, 2014, pp. 165-181.

Matetic, et al., "ROTE: Rollback protection for trusted execution", In Proceedings of the 26th USENIX Security Symposium, Aug. 16, 2017, pp. 1289-1306.

"International Search Report and Written Opinion Issued in PCT Application No. PCT/US19/013884", dated Apr. 5, 2019, 14 Pages.

Sarmenta, et al., "Virtual Monotonic Counters and Count-limited Objects Using a TPM Without a Trusted OS", In the Proceedings of the First ACM Workshop on Scalable Trusted Computing, Nov. 3, 2006, 15 Pages.

Setty, et al., "Enabling Secure and Resource-Efficient Blockchain Networks with VOLT", Retrieved from: https://www.microsoft.com/en-us/research/wp-content/uploads/2017/08/volt.pdf, Aug. 8, 2017, 15 Pages.

Solea, Eftychia, "Differentially Private Hypothesis Testing for Normal Random Variables", A Thesis Submitted for the Partial Fulfillment of the Requirements for the Degree of Masters of Science, The Pennsylvania State University, May 2014, 171 Pages.

Tang, et al., "Privacy Loss in Apple's Implementation of Differential Privacy on MacOS 10.12", In Journal of Computing Research Repository, vol. 1709, Sep. 10, 2017, 12 Pages.

"Intel Software Guard Extensions (Intel SGX)", Retrieved from: https://web.archive.org/web/20170918182758/https://software.intel.com/en-us/sgx, Sep. 18, 2017, 4 Pages.

"Final Office Action Issued in U.S. Appl. No. 15/815,593", dated Aug. 4, 2020, 19 Pages.

Mivule, Kato, "Utilizing Noise Addition for Data Privacy, an Overview", In Proceedings of the International Conference on Information and Knowledge Engineering, Jul. 1, 2012, pp. 65-71.

"Non Final Office Action Issued in U.S. Appl. No. 15/815,593", dated Feb. 3, 2020, 16 Pages.

\* cited by examiner

REMOTE TESTING ANALYSIS FOR SOFTWARE OPTIMIZATION BASED ON CLIENT-SIDE LOCAL DIFFERENTIAL PRIVACY-BASED DATA

CROSS REFERENCE TO RELATED APPLICATION

This application claims priority to U.S. Provisional Application Ser. No. 62/625,323, filed Feb. 1, 2018, and entitled "Remote Testing Analysis based on Client-Side Local Differential Privacy-Based Data," the entirety of which is incorporated by reference herein.

BACKGROUND

Randomized controlled experiments (or A/B testing) and hypothesis tests are important engineering tools that need to be privacy compliant as user scrutiny increases and regulations tighten. Local differential privacy (LDP) has emerged as a standard for privacy guarantees. One problem associated with this technology is how to conduct statistical hypothesis testing under client-side LDP, since LDP's privatization algorithm injects noise into the data that prevents existing statistical computations from producing accurate results.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments described herein are directed to remotely analyzing testing results that are based on data obtained from client devices in accordance with a local differential privacy (LDP) scheme in order to determine an effect of a software application with respect to its features and/or the population in which the application is tested. The analysis is based on a series of statistical computations for conducting hypothesis tests to compare population means (e.g., in A/B testing), while ensuring LDP for each user. For example, an LDP scheme is used on the client-side that privatizes a measured value corresponding to a usage of a resource of the client. A data collector receives the privatized data from two sets of populations (e.g., population A and population B), for example, over a network. The clients of each population have a software application that may differ in terms of features or user group. The privatized data received from each population is analyzed to determine an effect of the difference between the software applications of the first population and software applications of the second population.

In accordance with an embodiment, a transformation-based LDP test is used, in which a binomial distribution mean of the privatized data received from the first population and a binomial distribution mean of the privatized data received from the second population are utilized to determine the effect of the difference between the software applications. The binomial distribution means are proportional to the true (or actual) means of the measured values.

In accordance with another embodiment, an estimation-based LDP test is used, in which a sample mean and sample variance of the privatized data received from the first population and a sample and a sample variance of the privatized data received from the second population are utilized to determine the effect of the difference between the software applications.

In accordance with a further embodiment, a hybrid LDP test is utilized for cases in which a subset of the first and/or second population does not utilize LDP. The aforementioned transformation-based LDP test may be extended to support such a scenario. In accordance with such an embodiment, data that is privatized is rescaled by the client to enable the data collector to form a mixed sample that comprises both the privatized data and non-privatized data. A mean of the combined privatized data and the non-privatized data received from the first population and a mean of the combined privatized data and the non-privatized data received from the second population are utilized to determine the effect of the difference between the software applications. The distribution of the combined privatized data and non-privatized data for each population has the same means as the true means of the measured values of the corresponding population.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Figure 1:
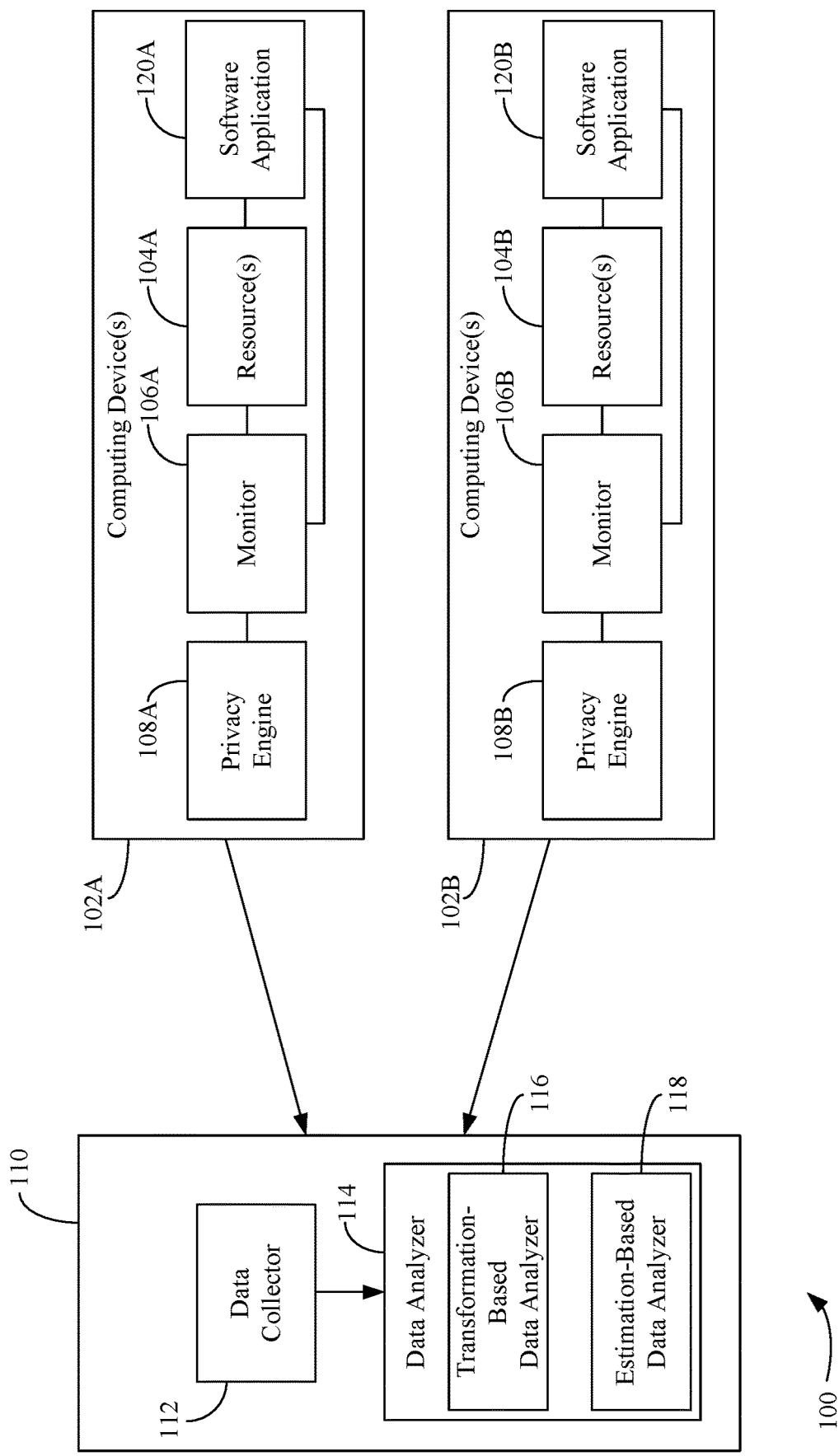
FIG. 1 depicts a block diagram of a system for remotely analyzing testing results that are based on an LDP scheme in accordance with example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. System and Method for Remotely Analyzing Testing Results that are Based on a Local Differential Privacy Scheme Randomized controlled experiments (or A/B testing) and hypothesis tests are used by many companies, e.g., Google, Facebook, Amazon, and Microsoft, to design and improve their products and services. These statistical techniques base business decisions on samples of actual customer data collected during experiments to make more informed product decisions. However, such data samples usually contain sensitive information (e.g., usage statistics of certain applications or services). Meeting users' privacy expectations and tightening privacy regulations (e.g., European General Data Protection Regulation (GDPR) law), ensuring that these experiments and tests do not breach the privacy of individuals, is an important problem.

Differential privacy (DP) has emerged as a standard for privacy guarantees and been used by, e.g., Apple, Google, and Uber. In previous implementations of DP, users trust and send exact data to a data collector, that then injects noise in the testing process to ensure DP. However, previous approaches are inadequate as users may not trust the data collector (e.g., a technology company) due to potential hacks and leaks, and prefer not to have un-privatized data leave their devices. LDP may be one alternative to the techniques described above. Under LDP, users do not need to trust the data collector. Before data is sent to the data collector, each user's data is privatized by a randomized algorithm with the property that the likelihood of any specific output of the algorithm varies with the input (i.e., the exact data).

An A/B test split is a method of comparing two versions of a software application, a webpage, etc. against each other to determine which one performs better or for other purposes. It is a form of statistical hypothesis testing. This test may be performed in a manner such that a first version (i.e., version A) of the software application or webpage is provided to a first population of users (referred to as control group), and a second version (i.e., version B) is provided to a second population of users (referred to as a treatment group). Statistical analysis is used to determine which variation performs better. The analysis may involve forming a default position, referred to as a null hypothesis ($H_0$), that the two population means are equal or differ by a fixed constant. Statistical tests (e.g., t-tests) are used to determine whether the null hypothesis should be rejected based on random samples from the populations. For example, suppose an A/B test is testing whether a particular feature provides a meaningful improvement to a software application, the null hypothesis would be that version B (which would include the feature) of the software application is not a meaningful improvement over version A (which would not include the feature). The null hypothesis is disproved by showing that version B is a statistically significant improvement over version A. The null hypothesis is not disproved if no statistically significant improvement is not shown. It is noted that the statistical hypothesis testing may also be used to test the same version of a software application (or webpage) against two different user populations. This type of testing may be used to determine whether a certain demographic is more likely to use a certain feature or to determine how the feature affects computing resource usage of one demographic versus another demographic's computing resource usage.

A test may have three steps: 1) compute the observed value of a test statistic from samples; 2) calculate the p-value, i.e., the probability, under the null hypothesis, of a test statistic being more extreme than the observed one; 3) reject the null hypothesis if and only if the p-value is less than the significance level (a pre-specified threshold that binds the probability of falsely rejecting the null hypothesis when it is true (also referred to as a type-I error (denoted as $\alpha$)).

For example, suppose each user has a real-valued counter $x \in \Sigma = [0, m]$ that is used to measure some characteristic of a user's computing device (e.g., the user's application usage), where m is a predetermined maximum value for the counter. In this example, let $[n] = \{1, 2, \ldots, n\}$ and $X = \{x_i\}_{i \in [n]}$ be a (sample) set of counters from n users. The sample mean and the sample variance of X are shown below with reference to Equations 1 and 2, respectively:

$$\mu_x = \Sigma_i x_i / n \quad \text{(Equation 1)}$$

$$s_x^2 = \Sigma_i (x_i - \mu_x)^2 / (n-1) \quad \text{(Equation 2)}$$

It is noted that X (or A, B) is used to denote both a population and the distribution of this population, from which a sample X (or A, B) is drawn.

In particular, let A and B be the distributions of counters in the control group and the treatment group, respectively, and let $\mu_A$ be the population means (expectations) for A and $\mu_B$ be the population means (expectations) for B. The null hypothesis ($H_0$) and the alternative hypothesis ($H_1$) are shown below with reference to Equations 3 and 4, respectively:

$$H_0: \mu_A - \mu_B = d_0 \quad \text{(Equation 3)}$$

$$H_1: \mu_A - \mu_B \neq d_0 \quad \text{(Equation 4)}$$

where $\mu_A$ is the mean of the control group distribution, $\mu_B$ is the mean of the treatment group distribution, and $d_0$ represents the difference between the means. If a number $n_A$ and a number $n_B$ users from the populations A and B are randomly picked, then the corresponding samples would be represented as $A = \{a_i\}_{i \in [n_B]}$ and $B = \{b_i\}_{i \in [n_B]}$, respectively.

The statistical test, T, takes the two samples A and B and decides whether to reject or accept $H_0$ at a predetermined significance level $\alpha$. T should be optimized such that the type-I error is at most $\alpha$ (i.e., $\Pr[T(A, B; \alpha, H_0) = \text{reject}|H_0] \leq \alpha$) and the type-II error (i.e., the probability of failing to reject the null hypothesis when it is false (denoted as $\beta$) is as small as possible (i.e., $\Pr[T(A, B; \alpha, H_0) = \text{accept}|H_1] \leq \beta$). It is noted that $1-\beta$ is referred to as the statistical power of T. The probability is taken over the randomness from the data generation (of A and B) and the possible randomness in T.

A key step in a test is to compute the observed value of a test statistic from samples. To compare population means, it is usually a function of six parameters: sample means $\mu_A$ and $\mu_B$, sample variances $s_A^2$ and $s_B^2$, and sample sizes $n_A$ and $n_B$. In t-tests, another parameter is needed, which is referred to as the degrees of freedom in which the test statistic can vary. The test statistic t and the degrees of freedom df may be determined in accordance with Equations 5 and 6, respectively, which are shown below:

$$t = \frac{(\mu_A - \mu_B) - d_0}{\sqrt{s_A^2/n_A + s_B^2/n_B}} \quad \text{(Equation 5)}$$

$$df = \frac{(s_A^2/n_A + s_B^2/n_B)^2}{\frac{(s_A^2/n_A)^2}{n_A - 1} + \frac{(s_B^2/n_B)^2}{n_B - 1}} \quad \text{(Equation 6)}$$

In t-tests (as well as Z-tests when population variances are unknown) that compare population means, sample means and sample variances are the essential terms in the test statistic to be computed in the first step. While there are several approaches to estimate means, there is no known technique to estimate sample variances with respect to LDP-based data.

Embodiments described herein overcome this problem. For example, in accordance with an embodiment, an estimation-based LDP test is utilized to estimate sample variances using an estimation of the observed test statistic of the above-referenced first step to calculate the p-value and draw the conclusion. One goal of hypothesis testing is to control the probability of drawing a false conclusion in terms of type-I errors and type-II errors (i.e., the probability of failing to reject the null hypothesis when it is false). The estimation-based LDP test is useful when the size of the data domain is relatively small. However, issues arise when the size of the data domain is relatively large. As errors in both the estimated sample means and estimated variances are proportional to the domain size, it is difficult to bound the error in estimating the tests statistic in the first step. Thus, there is no theoretical guarantee of type-I and type-II errors when using the estimation-based LDP test.

In accordance with another embodiment, a transformation-based LDP test is used to provide an upper bound of type-II error(s) at a pre-specified significance level, i.e., a hard constraint of type-I error(s). The idea is to analyze the relationship between the original distribution of a population and the distribution on the outputs of the LDP data-collection algorithm on users' data (referred herein as a transformed distribution). Instead of estimating sample means and sample variances of LDP-based data (as done in the estimation-based LDP test), tests are conducted based on LDP data samples from the transformed distributions. The conclusion can then be translated into a conclusion of the test on the original population (i.e., rejecting or accepting the null hypothesis). The foregoing techniques may also be extended to a hybrid-privacy scenario where some users require LDP, while other users are willing to provide exact (or the actual) data.

The foregoing techniques may advantageously determine an effect that the software application being tested has on one or more resources of the clients (e.g., computing devices) utilized by the first population and the second population. Such resources include, but are not limited to, the client's processor, memory, one or more sensors (e.g., a gyroscope, a magnetometer, an accelerometer, etc.) I/O ports, I/O devices, network bandwidth, a power source (e.g., a battery), an operating system, etc. A tester may utilize this information to optimally design the software application to minimize the usage of such resource(s), thereby ultimately improving the functionality and efficiency of the clients.

Moreover, the foregoing techniques provide improvements in other technologies, namely data security. Depending on the implementation the privatized data comprises either a one-bit value or a two-bit value that is representative of the measured values. This privatization of the data advantageously renders the meaningless to a third-party (e.g., a malicious entity or government) that accesses such data illegally (e.g., via a hack). Moreover, because the amount of data transmitted between the clients and the data collector are so small, the amount of network bandwidth consumed when transforming privatized data is minimal.

Various example embodiments are described in the following subsections. In particular, Subsection A describes systems and methods for the transformation-based LDP test and the estimation-based LDP test, and Subsection B describes systems and method for the hybrid-privacy scenario.

A. Systems and Methods for the Transformation-Based LDP Test and the Estimation-Based LDP Test FIG. 1 is a block diagram of a system 100 for remotely analyzing testing results that are based on an LDP scheme in accordance with embodiments. As shown in FIG. 1, system 100 includes one or more computing devices 102A, one or more computing devices 102B, and a server 110. Computing devices 102A may be utilized by user(s) of a first population (corresponding to a control group), and computing device(s) 102B may be utilized by user(s) of a second population (corresponding to a treatment group) for which features of a software application are tested. Computing device(s) 102A may be configured to execute a first version (e.g., version A) of a software application that includes a particular feature being tested (e.g., A/B tested), and computing device(s) 102B may be configured to execute a second version of the software application (shown as software application B) that does not include the particular feature or includes a different feature. Alternatively, computing device(s) 102A and computing device(s) 102B may be configured to execute the same version of the software application (i.e., software application 120A and software application 120B are the same version). This configuration may be used, for example, to determine whether a certain population is more likely to use a certain feature or to determine how the feature affects computing resource usage of one population versus another population's computing resource usage.

Each of computing device(s) 102A includes one or more resources 104A, a monitor 106A, and a privacy engine 108A. Each of computing device(s) 102B are also configured to include one or more resources 104B, a monitor 106B, and a privacy engine 108B. Resource(s) 104A and 104B may include one or more software resources and one or more hardware resources. Examples of software resources include, but are not limited to, one or more software applications and/or processes included in and/or executing on computing device(s) 102A and computing device(s) 102B (e.g., software application 120A and software application 120B), an operating system included in and/or executing on computing device(s) 102A and computing device(s) 102B, etc. Software resource(s) may also include one or more features of the software application(s) and/or operating system. For example, the feature(s) may include a graphical user interface (GUI), a user-interactive element of the GUI (e.g., a button, menu, slider, text boxes, etc.), or any other feature, including, but not limited to, functional features of the software application(s) and/or operating system. Examples of hardware resource(s) include, but are not limited to, one or more processors of computing device(s) 102A and computing device(s) 102B, one or more memories of computing device(s) 102A and computing device(s) 102B, one or more input/output (I/O) ports or I/O devices of computing device(s) 102A and computing device(s) 102B, sensor(s) of computing device(s) 102A and computing device(s) 102B, network bandwidth of computing device(s) 102A and computing device(s) 102B, a power source (e.g., a battery) of computing device(s) 102A and computing device(s) 102B, etc.

Examples of memor(ies) include, but are not limited to a hard disk drive, a solid state drive, a removable magnetic disk, a removable optical disk (e.g., CDROMs, DVDs, etc.), zip disks, tapes, magnetic storage devices, MEMS (microelectromechanical systems) storage, nanotechnology-based storage devices, as well as other media such as flash memory cards, digital video discs, random access memory (RAM) devices, read-only memory (ROM) devices, and the like. Examples of I/O devices include as monitors, keyboards, pointing devices, video game controllers, remote control devices, etc.

Computing device(s) 102A and computing device(s) 102B may comprise any of a wide variety of computing devices mentioned herein or otherwise known, including but not limited to a desktop computer, a tablet computer, a laptop computer, a smart phone, etc. However, these examples are not intended to be limiting and computing device(s) 102A and computing device(s) 102B may include other types of devices other than those listed herein.

Each of monitor 106A and monitor 106B is configured to monitor resource(s) (or usage thereof) of its corresponding computing device (e.g., monitor 106A monitors resource(s) 104A and/or software application 120A of a corresponding computing device of computing device(s) 102A, and monitor 106B monitors resource(s) 104B and/or software application 120B of a computing device of a corresponding computing device of computing device(s) 102B. For example, monitor 106A and monitor 106B may monitor the usage of processor(s), memor(ies), a power source, network bandwidth, I/O ports or I/O devices, the usage of software application(s) (e.g., software applications 120A or software application 120B (or feature(s) thereof)), and the usage of an operating system (or feature(s) thereof). Usage of the monitored software application(s) and/or operating system may include an amount of time that a user has spent interacting with the software application(s) (and/or features thereof) and/or operating system (and/or feature(s) thereof), a number of times that a user has interacted with the software application(s) (and/or features thereof) and/or operating system (and/or feature(s) thereof), etc.

The usage data monitored by monitor 106A is provided to privacy engine 108A, and the usage data monitored by monitor 106B is provided to privacy engine 108B. Each of privacy engine 108A and privacy engine 108B is configured to privatize the monitored data received thereby. In accordance with an embodiment, privacy engine 108A and privacy engine 108B privatizes the monitored data in accordance with an LDP scheme; however, the embodiments disclosed herein are no so limited.

When using LDP, also called a randomized response model, γ-amplification or, Framework and Accuracy in Privacy-Preserving mining (FRAPP), private data from each user is randomized by an algorithm U before being sent to a data collector (e.g., data collector 112). A randomized algorithm U may be defined in accordance with Equation 7, which is shown below $$Pr[U(x) \in S] \le e^{\varepsilon} \cdot Pr[U(y) \in S] \qquad \text{(Equation 7)}$$

where $U: \Sigma \rightarrow Z$ is ε-locally differentially private (ε-LDP) if for any pair of values x, y$\in \Sigma$ and any subset of output $S \subseteq Z$, and where ε represents the privacy budget (i.e., the aggressiveness of the privatization of data).

One interpretation of LDP is that no matter what output is released from U, it is approximately equally as likely to have from one value x∈S as any other. Unlike conventional data privacy (DP) models, users do not need to trust the data collector in LDP.

For example, suppose that each user in the control group (e.g., a user of one of computing device 102A) and that each user in the treatment group (e.g., a user of one of computing device 102B) is associated with a counter maintained by his or her associated computing device. The counter may be indicative of the user's usage with respect to a monitored resource. Two random samples of counters A and B are drawn from the control and the treatment distributions A and B, respectively. With the null hypothesis, as described above with reference to Equation 2, it is desired to design a test such that each counter in A and B is collected from the user in an ε-LDP way, its type-I error is less than or equal to the significance level α, and the type-II error is as small as possible.

The transformation-based LDP test may utilize a 1-bit data collection scheme, whereas the estimation-based LDP test may utilize a 2-bit or multi-bit data collection scheme. The 1-bit data collection scheme is described as follows. An ε-LDP mechanism $M_{\varepsilon,m}$ is used to privatize (e.g., inject noise into) data (e.g., each counter in samples A and B) as shown below in Equation 8:

$$M_{\varepsilon,m}(x) = \begin{cases} 1, & \text{with probability } \dfrac{1}{e^{\varepsilon}+1} + \dfrac{x}{m} \cdot \dfrac{e^{\varepsilon}-1}{e^{\varepsilon}+1} \\ 0, & \text{otherwise} \end{cases} \qquad \text{(Equation 8)}$$

where m represents a predetermined maximum value for x.

For each computing device (e.g., one of computing device(s) 102A or computing device(s) 102B) with a counter x, the corresponding privacy engine (e.g., privacy engine 108A or privacy engine 108B) generates a noisy bit (0 or 1), independently, and sends the noisy bit to data collector 112.

Privacy engine 108A and privacy engine 108B also send an identifier along with the noisy bit that identifies the type of resource being monitored.

The foregoing mechanism can be interpreted as firstly rounding x to a bit 1 with probability x/m, or 0 otherwise, and flipping the bit with probability $$\frac{1}{e^{\varepsilon}+1}.$$

It is communication-efficient (only one bit is sent).

$M_{\varepsilon,m}(x)$ can be used for mean estimation by data collector 112. For example, suppose there are n users: $X=\{x\}_{i\in[n]}$. Data collector 112 may collect $x'=M_{\varepsilon,m}(x_i)$ from each computing device (e.g., one of computing device(s) 102A or one of computing device(s) 102B). The mean $\mu_x=\Sigma_i x_i/n$ can be estimated from the noisy bits $X'=M_{\varepsilon,m}(X)=\{x'_i\}_{i\in[n]}$ as shown below in Equation 9:

$$\hat{\mu}_{\varepsilon,m}(X') = \frac{m}{n}\sum_{i=1}^{n}\frac{x'_i \cdot (e^{\varepsilon}-1)}{e^{\varepsilon}-1} \quad \text{(Equation 9)}$$

Additional details regarding privatizing data using a 1-bit value or a 2-bit or multi-bit value in accordance with LDP may be found in U.S. patent application Ser. No. 15/665,261, filed on Jul. 31, 2017, and entitled "Collection of Sensitive Data—such as Software Usage Data or other Telemetry Data—over Repeated Collection Cycles in Satisfaction of Privacy Guarantees," the entirety of which is incorporated by reference herein.

1. Transformation-Based LDP Test

As further shown in FIG. 1, server 110 comprises data collector 112 and data analyzer 114. Data collector 112 is configured receive privatized data from computing device(s) 102A and computing device(s) 102B. The privatized data may be received via a network. The network may comprise one or more networks such as local area networks (LANs), wide area networks (WANs), enterprise networks, the Internet, etc., and may include one or more of wired and/or wireless portions. Data collector 112 provides the collected data to data analyzer 114.

Data analyzer 114 is configured to perform hypothesis tests to compare population means using the received privatized data. For example, data analyzer 114 may (1) compute an observed value of a particular test statistic using the privatized data, (2) calculate a p-value, and (3) reject the null hypotheses if the p-value is less than the significance level.

In accordance with an embodiment, the foregoing may be achieved using a transformation-based LDP technique. For example, as shown in FIG. 1, data analyzer 114 includes a transformation-based data analyzer 116. Transformation-based data analyzer 116 is configured to analyze the relationship between the original distribution of a population and the distribution on the outputs of the LDP data-collection algorithm on users' data (referred herein as a transformed distribution). If measured data (e.g., a counter) x follows some (unknown) population distribution with a (unknown) mean μ, the LDP bit $M_{\varepsilon,m}(x)$ follows a binomial distribution in particular, a Bernoulli distribution, with the mean determined by μ and ε. In order to compare population means, transformation-based data analyzer 116 conducts tests directly on the received LDP bits and compares the Bernoulli means. The relationship between the original population distribution and the resulting Bernoulli distribution on the outputs of $M_{\varepsilon,m}(x)$ is show below in Equation 10:

$$p_x = Pr[x^{bin}=1] = \frac{\mu_x}{m}\cdot\frac{(e^{\varepsilon}-1)}{e^{\varepsilon}+1} + \frac{1}{e^{\varepsilon}+1} \quad \text{(Equation 10)}$$

where $x^{bin}$ follows a Bernoulli distribution.

In accordance with the transformation-based LDP test, two samples, $A=\{a_i\}_{i\in[n_B]}$ and $B=\{b_i\}_{i\in[n_B]}$, are drawn from two distributions A and B (i.e., computing device(s) 102A and computing device(s) 102B, respectively) with means $\mu_A$ and $\mu_B$. After the privacy engine (e.g., privacy engine 108A or privacy engine 108B) applies the mechanism $M_{\varepsilon,m}(x)$, the LDP bits collected from computing device(s) 102A and computing device(s) 102B (i.e., $A^{bin}=M_{\varepsilon,m}(A)=\{M_{\varepsilon,m}(a_i)\}_{i\in[n_A]}$ and $B^{bin}=M_{\varepsilon,m}(B)=\{M_{\varepsilon,m}(b_i)\}_{i\in[n_B]}$, respectively) become two samples from Bernoulli distributions with means $p_A$ and $p_B$.

Transformation-based data analyzer 116 calculates $p_A$ (i.e., the distribution mean of $A^{bin}$) and $p_B$ (i.e., the distribution mean of $B^{bin}$) based on the privatized data collected from computing device(s) 102A and computing device(s) 102B and conducts a statistical test based on a transformed null hypothesis, which is shown below in Equation 11:

$$H_0^{bin}: p_A - p_B = \frac{d_0}{m}\cdot\frac{e^{\varepsilon}-1}{e^{\varepsilon}+1} \quad \text{(Equation 11)}$$

Equation 11 is derived from the null hypothesis described above with reference to Equation 3.

The relative order between $\mu_A$ and $\mu_B$ is the same as the one between $p_A$ and $p_B$ (i.e., $\mu_A-\mu_B\geq d_0 \Leftrightarrow p_A-p_B\geq d_0^{bin}$). That is, the Bernoulli means are proportional to the true means of the monitored data. Therefore, transformation-based data analyzer 116 can conduct a statistical test on $A^{bin}$ and $B^{bin}$ to compare $p_A$ and $p_B$ with the transformed null hypothesis described above with reference to Equation 11 in order to compare $\mu_A$ and $\mu_B$ and reject or accept the transformed null hypothesis. The difference between the binomial (e.g., Bernoulli) means is equivalent to the difference between the distribution mean of the monitored values of the first population (i.e., $\mu_A$) and the distribution mean of the monitored values of the second population (i.e., $\mu_B$).

In accordance with an embodiment, transformation-based data analyzer 116 performs a statistical test $T_{\varepsilon}^{bin}$ (e.g., a t-test) with $H_0^{bin}$ on $A^{bin}$ and $B^{bin}$ at a significance level α. The non-transformed null hypothesis $H_0$ is accepted (or rejected) if and only if $H_0^{bin}$ is accepted (or rejected). In accordance with an embodiment, transformation-based data analyzer 116 performs a Z-test in lieu of a t-test if populations follow Normal distributions. It is noted that transformation-based data analyzer 116 may use any parameterized test in addition to or in lieu of t-tests and Z-tests.

To obtain a satisfactory statistical power, a larger sample size in $T_{\varepsilon}^{bin}$ is needed than compared to the size needed in a non-private statistical test performed on the real values in A and B. The upper bound on the type-II error(s) during A/B testing is important in estimating the number of users needed in the samples to detect significant differences between the control and the treatment groups. Intuitively, for a fixed gap between population means $\mu_A$ and $\mu_B$, the gap between $p_A$ and $p_B$ is smaller if the domains size m is larger or the privacy budget ε is smaller. It is noted that the smaller the gap between $p_A$ and $p_B$ is, the harder for the test $T_\varepsilon^{bin}$ to draw a significant conclusion.

The lower bounds of the power of $T_\varepsilon^{bin}$ (or sample sizes needed (i.e., the number of computing device(s) 102A and computing device(s) 102B needed)) at a significance level α (i.e., the type-I error is less than or equal to α) may be determined in accordance with Equations 12-15, which are shown below:

$$P(\theta) \stackrel{\Delta}{=} Pr[T_\varepsilon^{bin}(A, B) = \text{reject} \mid (\mu_A - \mu_B) - d_0 = \theta] \geq \quad \text{(Equation 12)}$$

$$1 - \exp\left(-\left(\frac{\theta(e^\varepsilon - 1)}{m(e^\varepsilon + 1)}\sqrt{\frac{2n_A n_B}{n_A + n_B}} - \sqrt{\ln\frac{1}{\alpha}}\right)^2\right)$$

where, in the case where the alternative hypothesis $H_1$: $\mu_A - \mu_B > d_0$ is true, $P(\theta)$ represents the statistical power (1-type-II error (or β)) of $T_\varepsilon^{bin}$ if the samples are large enough:

$$n_A + n_B = \Omega\left(\frac{m^2}{\theta^2 \varepsilon^2}\right)\ln\frac{1}{\alpha}.$$

If Normal distributions are used to approximate Binomial distributions and Student's t-distributions (under the condition that $n_A$ and $n_B$ are large enough, the following is true:

$$P(\theta) \geq 1 - F\left(F^{-1}(1 - \alpha) - \frac{p_\theta}{\hat{\sigma}_{A+B}}\right) \geq \quad \text{(Equation 13)}$$

$$1 - F\left(F^{-1}(1 - \alpha) - p_\theta \cdot \sqrt{\frac{4(n_A - 1)(n_B - 1)}{n_A + n_B - 2}}\right)$$

where $$p_\theta = \frac{\theta}{m} \cdot \frac{e^\varepsilon - 1}{e^\varepsilon + 1},$$

$F(\cdot)$ is the cumulative density function (CDF) of the Normal distribution $N(0,1)$, and the sample variance $\hat{\sigma}_{A+B}$ is:

$$\sqrt{\frac{1_{A^{bin}}/n_A - 1^2_{A^{bin}}/n_A^2}{n_A - 1} + \frac{1_{B^{bin}}/n_B - 1^2_{B^{bin}}/n_B^2}{n_B - 1}} \quad \text{(Equation 14)}$$

where $1_x = |\{x \in X | x=1\}|$ is the number of 1's in X.

In particular, if $n_A = n_B = n$ and the statistical power $P(\theta) \geq 1 - \beta$, the sample size may be calculated as follows:

$$n = (F^{-1}(1 - \alpha) - F^{-1}(\beta))^2 \cdot \frac{1}{2p_\theta^2} + 1 \quad \text{(Equation 15)}$$

As demonstrated above, the sample size estimation needed to reduce type-II errors below a threshold at a specified significance level is achievable. As further demonstrated above, the sample size needed to carry out a statistical test may be determined based on a significance level, the statistical power, and the effect size that represents a desired measure of the effect of the software application feature being tested. Any of the significance level, the statistical power or the effect size may be predetermined values. In certain embodiments, the statistical power may be determined based on a predetermined effect size, predetermined significance level and/or predetermined sample size. In additional embodiments, the effect size may be determined based on a predetermined statistical power, predetermined significance level and/or predetermined sample size. In further embodiments, the significance level may be determined based on a predetermined statistical power, predetermined effect size and/or predetermined sample size.

Figure 2:
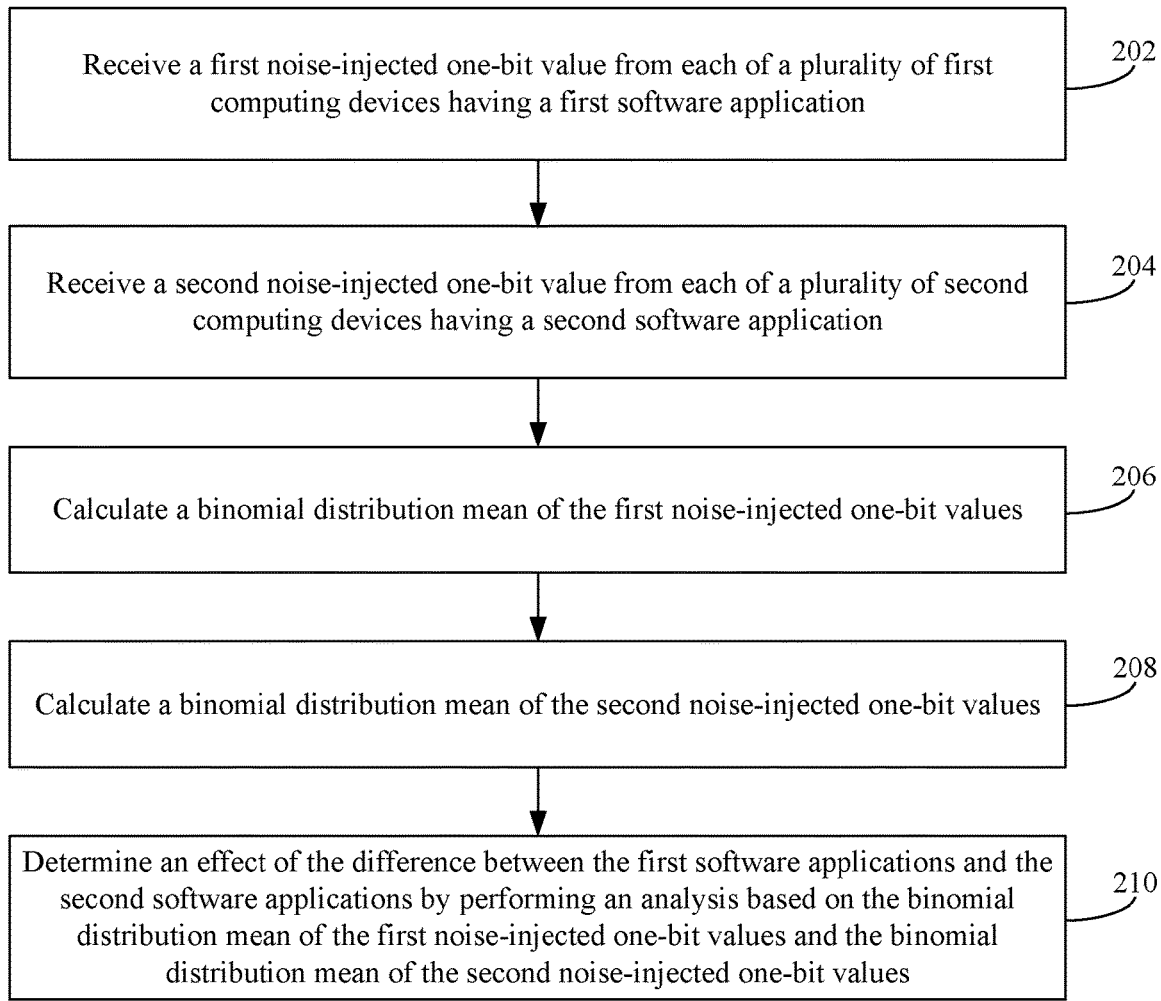
FIG. 2 depicts a flowchart of an example method for remotely analyzing testing results using a transformation-based test in accordance with an example embodiment.

Accordingly, privatized data may be remotely analyzed using a transformation-based test to determine an effect of a software application being tested in many ways. For example, FIG. 2 depicts a flowchart 200 of an example method for remotely analyzing testing results using a transformation-based test in accordance with an example embodiment. The method of flowchart 200 will now be described with continued reference to system 100 of FIG. 1, although the method is not limited to that implementation. Other structural and operational embodiments will be apparent to persons skilled in the relevant art(s) based on the discussion regarding flowchart 200 and the information modifier of FIG. 1.

As shown in FIG. 2, the method of flowchart 200 begins at step 202, in which a first noise-injected one-bit value is received from each of a plurality of first computing devices having a first software application. Each first noise-injected one-bit value is representative of a measured value that corresponds to usage of a resource of the first computing device from which it was received. The first noise-injected one-bit value is received by a computer-implemented data collector via a network. For example, with reference to FIG. 1, data collector 112 receives a first noise-injected one-bit value from each of first computing device(s) 102A that have software application 120A. The first noise-injected one-bit value represents a measured value (e.g., a counter) that corresponds to a usage of resource(s) 104A.

At step 204, a second noise-injected one-bit value is received from each of a plurality of second computing devices having a second software application. Each second noise-injected one-bit value is representative of a measured value that corresponds to usage of a resource of the second computing device from which it was received. The second noise-injected one-bit value is received by the computer-implemented data collector via the network. The first software applications are different with respect to the second software applications in terms of at least one user or at least one feature. For example, with reference to FIG. 1, data collector 112 receives a second noise-injected one-bit value from each of second computing device(s) 102B that have software application 120B. The second noise-injected one-bit value represents a measured value (e.g., a counter) that corresponds to a usage of resource(s) 104B.

In accordance with one or more embodiments, the first noise-injected one-bit values and the second noise-injected one-bit values are noise-injected in accordance with a LDP policy. For example, with reference to FIG. 1, privacy engine 108A applies an LDP policy to noise-inject the first noise-injected one-bit values, and privacy engine 108B applies an LDP policy to noise-inject the second noise-injected one-bit values.

In accordance with one or more embodiments, the resources of the first computing devices (e.g., computing device(s) 102A) or the resources of the second computing devices (e.g., computing device(s) 102B) comprise a software application or features thereof, an operating system or features thereof, a processor, a memory, at least one of input/output (I/O) ports or I/O devices, a sensor, network bandwidth, or a power source.

At step 206, a binomial distribution mean of the first noise-injected one-bit values is calculated by a computer-implemented data analyzer. For example, with reference to FIG. 1, transformation-based data analyzer 116 calculates a binomial distribution mean of the first noise-injected one-bit values. Transformation-based data analyzer 116 may calculate the binomial distribution mean in accordance with Equation 10 as described above.

At step 208, a binomial distribution mean of the second noise-injected one-bit values is calculated by a computer-implemented data analyzer. For example, with reference to FIG. 1, transformation-based data analyzer 116 calculates a binomial distribution mean of the second noise-injected one-bit values. Transformation-based data analyzer 116 may calculate the binomial distribution mean in accordance with Equation 10 as described above.

In accordance with one or more embodiments, the binomial distribution mean of the first noise-injected one-bit values and the binomial distribution mean of the second noise-injected one-bit values are Bernoulli means proportional to the true means of the measured values.

At step 210, an effect of the difference between the first software applications and the second software applications is determined by the computer-implemented data analyzer by performing an analysis based on the binomial distribution mean of the first noise-injected one-bit values and the binomial distribution mean of the second noise-injected one-bit values. For example, with reference to FIG. 1, transformation-based data analyzer 116 determines an effect of difference between the first software applications (e.g., software application 120A) and the second software applications (e.g., software application 120B) by performing an analysis based on the binomial distribution mean of the first noise-injected one-bit values and the binomial distribution mean of the second noise-injected one-bit values.

In accordance with one or more embodiments, the effect of the difference is output to a user of server 110 (or a computing device communicatively coupled thereto) so that he or she can observe the effect and potentially take action on it (e.g., make modifications to the software application being tested (e.g., software application 120A and/or software application 120B) in order to provide a more desired effect). The effect may be displayed via a graphical user interface (GUI), provided via an automatically-generated report, etc.

In accordance with one or more embodiments, performing the analysis comprises performing a statistical test with a null hypothesis that is based on (1) a difference between the binomial distribution mean of the first noise-injected one-bit values and the binomial distribution mean of the second noise-injected one-bit values, the difference being equivalent to a difference between a first distribution mean of the measured values of the plurality of first computing devices and a second distribution mean of the measured values of the plurality of second computing devices, and (2) a predetermined maximum for the measured values. For example, with reference to FIG. 1, transformation-based data analyzer 116 performs the analysis by performing a statistical test with the null hypothesis described above with reference to Equation 11.

In accordance with one or more embodiments, the statistical test is at least one of a t-test, a Z-test or a statistical hypothesis test configured to compare two population means.

In accordance with one or more embodiments, a number of the plurality of first computing devices from which the first noise-injected one-bit values are received and a number of the plurality of second computing devices from which the second noise-injected one-bit values are received are determined based on a predetermined significance level representing a probability of falsely rejecting the null hypothesis when it is true, a statistical power representing a probability of failing to reject the null hypothesis when it is true, and an effect size that represents a desired measure of the effect of the software application feature. For example, with reference to FIG. 1, transformation-based data analyzer 116 determines a number of first computing device(s) 102A from which the first noise-injected one-bit values are received and a number of second computing device(s) 102B from which the second noise-injected one-bit values are received in accordance with Equation 15, as described above.

In accordance with one or more embodiments, the statistical power is predetermined and the effect size is determined based on at least the predetermined statistical power. For example, with reference to FIG. 1, transformation-based data analyzer 116 determines the effect size based on at least a predetermined statistical power.

In accordance with one or more embodiments, the effect size is predetermined and the statistical power is determined based on at least the predetermined effect size. For example, with reference to FIG. 1, transformation-based data analyzer 116 determines the statistical power based on at least a predetermined effect size.

In accordance with one or more embodiments, the determined effect is utilized to make at least one of a design modification to the first software application that reduces the usage of the resource of the first computing device, whereby at least one of a functionality or an efficiency of the first computing device is improved, or a design modification to the second software application that reduces the usage of the resource of the second computing device, whereby at least one of a functionality or an efficiency of the second computing device is improved.

2. Estimation-Based LDP Test

Referring again to FIG. 1, data analyzer 114 may comprise an estimation-based data analyzer 118 in lieu or in addition to transformation-based data analyzer 116. When using an estimation-based LDP test, each of privacy engine 108A and privacy engine 108B is configured to provide a noise-injected two-bit value, where the second bit of the noise-injected two-bit value is a squared version of the first bit of the noise-injected two-bit value. Furthermore, the first bit of the noise-injected two-bit value may be generated in accordance with a first privacy budget $\varepsilon_1$, and the second bit of the noise-injected two-bit value may be generated in accordance with a second privacy budget $\varepsilon_2$, where $\varepsilon = \varepsilon_1 + \varepsilon_2$.

Estimation-based data analyzer 118 is configured to analyze the received noise-injected two-bit values received from computing device(s) 102A and computing device(s) 102B and determine the effect of the difference between of software application 120A and software application 120B being tested. The foregoing may be accomplished based on sample means and sample variances calculated based on the received noise-injected two-bit values.

For example, for each computing device i of first computing device(s) 102A, the first bit of the noise-injected two-bit value received may be represented as $a'_i = M_{\varepsilon_1, m}(\alpha_i)$, and the second bit of the noise-injected two-bit value received may be represented as $a''_i = M_{\varepsilon_2,m^2}(a_i^2)$. For each computing device i of second computing device(s) 102B, the first bit of the noise-injected two-bit value received may be represented as $b'_i = M_{\varepsilon_1,m}(b)$, and the second bit of the noise-injected two-bit value received may be represented as $b''_i = M_{\varepsilon_2,m^2}(b_i^2)$.

Data collector 112 receives first noise-injected bit $a'_i$ and second noise-injected bit $a''_i$ from each of first computing device(s) 102A, and receives first noise-injected $b'_i$ and second noise-injected bit $b''_i$ from each of second computing device(s) 102B. The received noise-injected two-bit values (i.e., $a'_i$ and $a'_{ii}$) received from first computing device(s) 102A may be collectively represented as $A' = \{a'_i\}$ and $A'' = \{a''_i\}$, and the received noise-injected two-bit values (i.e., $b'_i$ and $b'_{ii}$) received from second computing device(s) 102B may be collectively represented as $B' = \{b'_i\}$ and $B'' = \{b''_i\}$.

Estimation-based data analyzer 118 is configured to calculate a first sample mean based on A' and calculate a first sample variance based on A' and A''. In particular, the first sample mean $\hat{u}_A = \hat{u}_{\varepsilon_1,m}(A')$ is calculated in accordance with Equation 9, where X' and x' are replaced with A' and $a'_i$ respectively. The first sample variance may be calculated in accordance with Equation 16, which is shown below:

$$\hat{s}_A^2 = \hat{s}_{\varepsilon_1,\varepsilon_2,m}^2(A', A'') = \frac{\hat{\mu}_{\varepsilon_2,m^2}(A'') - \hat{\mu}_{\varepsilon_1,m}(A'))}{n_A - 1} \quad \text{(Equation 16)}$$

where $n_A$ represents the number of computing device(s) 102A.

Estimation-based data analyzer 118 is configured to calculate a second sample mean based on B' and calculate a second sample variance based on B' and B''. In particular, the second sample mean $\hat{u}_B = \hat{u}_{\varepsilon_1,m}(B')$ is calculated in accordance with Equation 9, where X' and x' are replaced with B' and $b'_i$ respectively. The first sample variance may be calculated in accordance with Equation 17, which is shown below:

$$\hat{s}_B^2 = \hat{s}_{\varepsilon_1,\varepsilon_2,m}^2(B', B'') = \frac{\hat{\mu}_{\varepsilon_2,m^2}(B'') - \hat{\mu}_{\varepsilon_1,m}(B'))}{n_B - 1} \quad \text{(Equation 17)}$$

where $n_B$ represents the number of computing device(s) 102B.

Using the calculated first sample mean, first sample variance, second sample mean, and second sample variance, estimation-based data analyzer 118 may calculate the test statistic $\hat{t}$ and the degrees of freedom $\widehat{df}$ in accordance with Equations 5 and 6, respectively, as described above. After calculating the test statistic $\hat{t}$ and the degrees of freedom $\widehat{df}$, estimation-based data analyzer 118 may perform a statistical test (e.g., a t-test) with the null hypothesis of Equation 3, the test statistic $\hat{t}$, and the degrees of freedom $\widehat{df}$.

Figure 3:
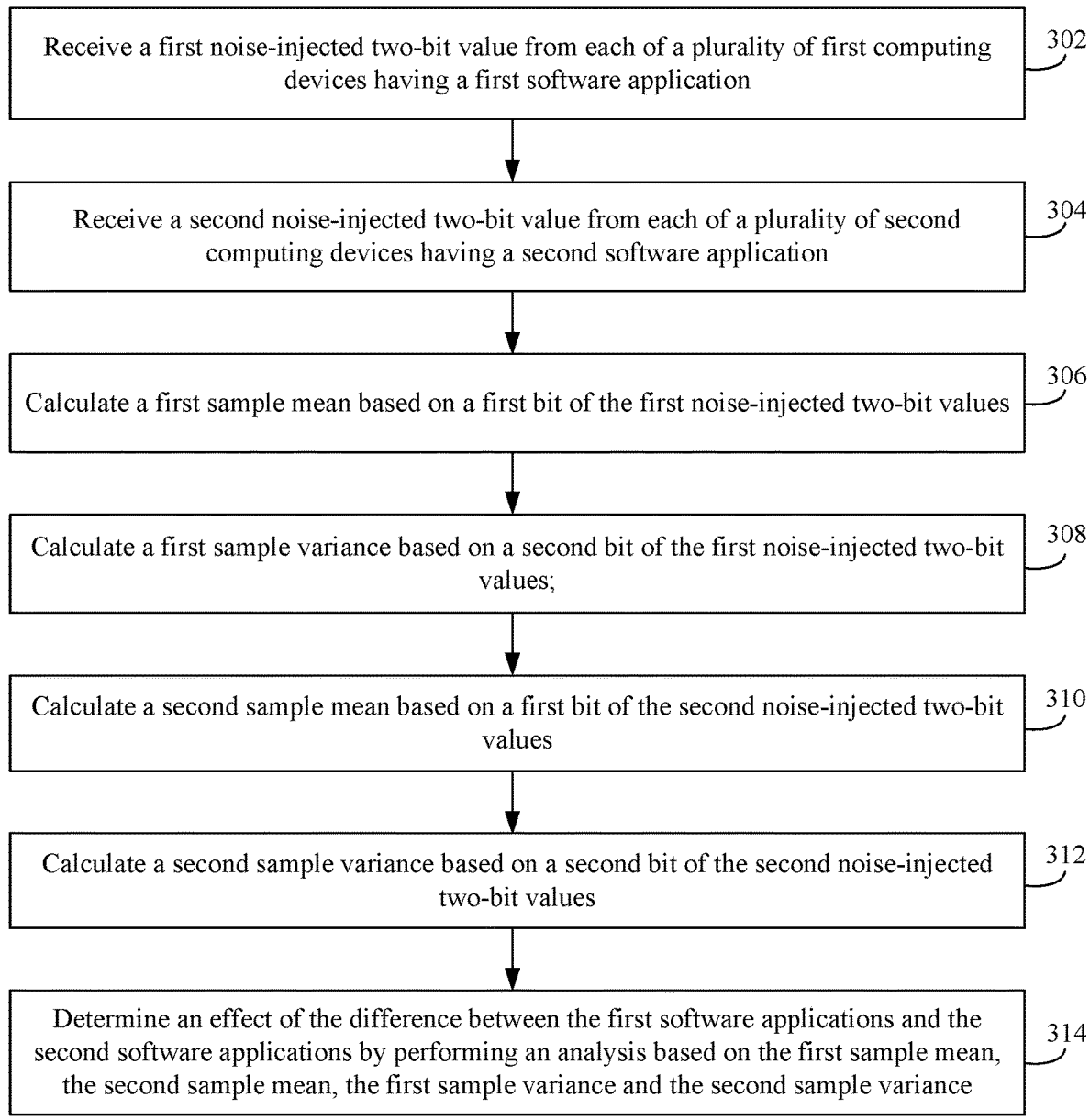
FIG. 3 depicts a flowchart of an example method for remotely analyzing testing results using an estimation-based test in accordance with an example embodiment.

Accordingly, privatized data may be remotely analyzed using an estimation-based test to determine an effect of a software application being tested in many ways. For example, FIG. 3 depicts a flowchart 300 of an example method for remotely analyzing testing results using an estimation-based test in accordance with an example embodiment. The method of flowchart 300 will now be described with continued reference to system 100 of FIG. 1, although the method is not limited to that implementation.

Other structural and operational embodiments will be apparent to persons skilled in the relevant art(s) based on the discussion regarding flowchart 300 and system 100 of FIG. 1.

As shown in FIG. 3, the method of flowchart 300 begins at step 302, in which a first noise-injected two-bit value is received from each of a plurality of first computing devices having a first software application. Each first noise-injected two-bit value is representative of a measured value that corresponds to usage of a resource of the first computing device from which it was received. The first noise-injected two-bit value is received by a computer-implemented data collector via a network. For example, with reference to FIG. 1, data collector 112 receives a first noise-injected two-bit value from each of first computing device(s) 102A that have software application 120A. The first noise-injected two-bit value represents a measured value (e.g., a counter) that corresponds to a usage of resource(s) 104A.

At step 304, a second noise-injected two-bit value is received from each of a plurality of second computing devices having a second software application. Each second noise-injected two-bit value is representative of a measured value that corresponds to usage of a resource of the second computing device from which it was received. The second noise-injected two-bit value is received by the computer-implemented data collector via a network. The first software applications are different with respect to the second software applications in terms of at least one user or at least one feature. For example, with reference to FIG. 1, data collector 112 receives a second noise-injected two-bit value from each of second computing device(s) 102B that have software application 120B. The second noise-injected two-bit value represents a measured value (e.g., a counter) that corresponds to a usage of resource(s) 104B.

In accordance with one or more embodiments, the first noise-injected two-bit values and the second noise-injected two-bit values are noise-injected in accordance with a LDP policy. For example, with reference to FIG. 1, privacy engine 108A applies an LDP policy to noise-inject the first two-bit values, and privacy engine 108B applies an LDP policy to noise-inject the second two-bit values.

In accordance with one or more embodiments, the resources of the first computing devices (e.g., computing device(s) 102A) or the resources of the second computing devices (e.g., computing device(s) 102B) comprise a software application or features thereof, an operating system or features thereof, a processor, a memory, at least one of input/output (I/O) ports or I/O devices, a sensor, network bandwidth, or a power source.

At step 306, a first sample mean is calculated based on a first bit of the first noise-injected two-bit values. For example, with reference to FIG. 1, estimation-based data analyzer 118 calculates a first sample mean based on a first bit of the first noise-injected two-bit values. The first sample mean may be calculated in accordance with Equation 9.

At step 308, a first sample variance is calculated based on a second bit of the first noise-injected two-bit values. For example, with reference to FIG. 1, estimation-based data analyzer 118 calculates a first sample variance based on a second bit of the first noise-injected two-bit values. The first sample variance may be calculated in accordance with Equation 16.

At step 310, a second sample mean is calculated based on a first bit of the second noise-injected two-bit values. For example, with reference to FIG. 1, estimation-based data analyzer 118 calculates a second sample mean based on a first bit of the second noise-injected two-bit values. The second sample mean may be calculated in accordance with Equation 9.

At step 312, a second sample variance is calculated based on a second bit of the second noise-injected two-bit values. For example, with reference to FIG. 1, estimation-based data analyzer 118 calculates a second sample variance based on a second bit of the second noise-injected two-bit values. The second sample variance may be calculated in accordance with Equation 17.

At step 314, an effect of the difference between the first software applications and the second software applications is determined by performing an analysis based on the first sample mean, the second sample mean, the first sample variance, and the second sample variance. For example, with reference to FIG. 1, estimation-based data analyzer 118 determines an effect of the difference between the first software applications and the second software applications by performing an analysis based on the first sample mean, the second sample mean, the first sample variance, and the second sample variance.

In accordance with one or more embodiments, the effect of the difference is output to a user of server 110 (or a computing device communicatively coupled thereto) so that he or she can observe the effect and potentially take action on it (e.g., make modifications to the software application being tested (e.g., software application 120A and/or software application 120B) in order to provide a more desired effect). The effect may be displayed via a graphical user interface (GUI), provided via an automatically-generated report, etc.

In accordance with one or more embodiments, a test statistic and degrees of freedom in which the test statistic can vary are determined based on the on the first sample mean, the second sample mean, the first sample variance, and the second sample variance, and the statistical test is performed with a null hypothesis that is based on the test statistic and the degrees of freedom. For example, with reference to FIG. 1, estimation-based data analyzer 118 performs the analysis by performing a statistical test with the null hypothesis described above with reference to Equation 3. The test statistic may be determined in accordance with Equation 5, and the degrees of freedom may be determined in accordance with Equation 6, as respectively described above.

In accordance with one or more embodiments, the statistical test is at least one of a t-test, a Z-test, or a statistical hypothesis test that is configured to compare two population means.

In accordance with one or more embodiments, a number of the plurality of first computing devices from which the first noise-injected two-bit values are received and a number of the plurality of second computing devices from which the second noise-injected two-bit values are received are determined based on a predetermined significance level representing a probability of falsely rejecting the null hypothesis when it is true, a statistical power representing a probability of failing to reject the null hypothesis when it is true, and an effect size that represents a desired measure of the effect of the software application feature. For example, with reference to FIG. 1, estimation-based data analyzer 118 determines a number of first computing device(s) 102A from which the first noise-injected one-bit values are received and a number of second computing device(s) 102B from which the second noise-injected one-bit values are received in accordance with Equation 15, as described above.

B. Hybrid Privacy Scenario

Figure 4:
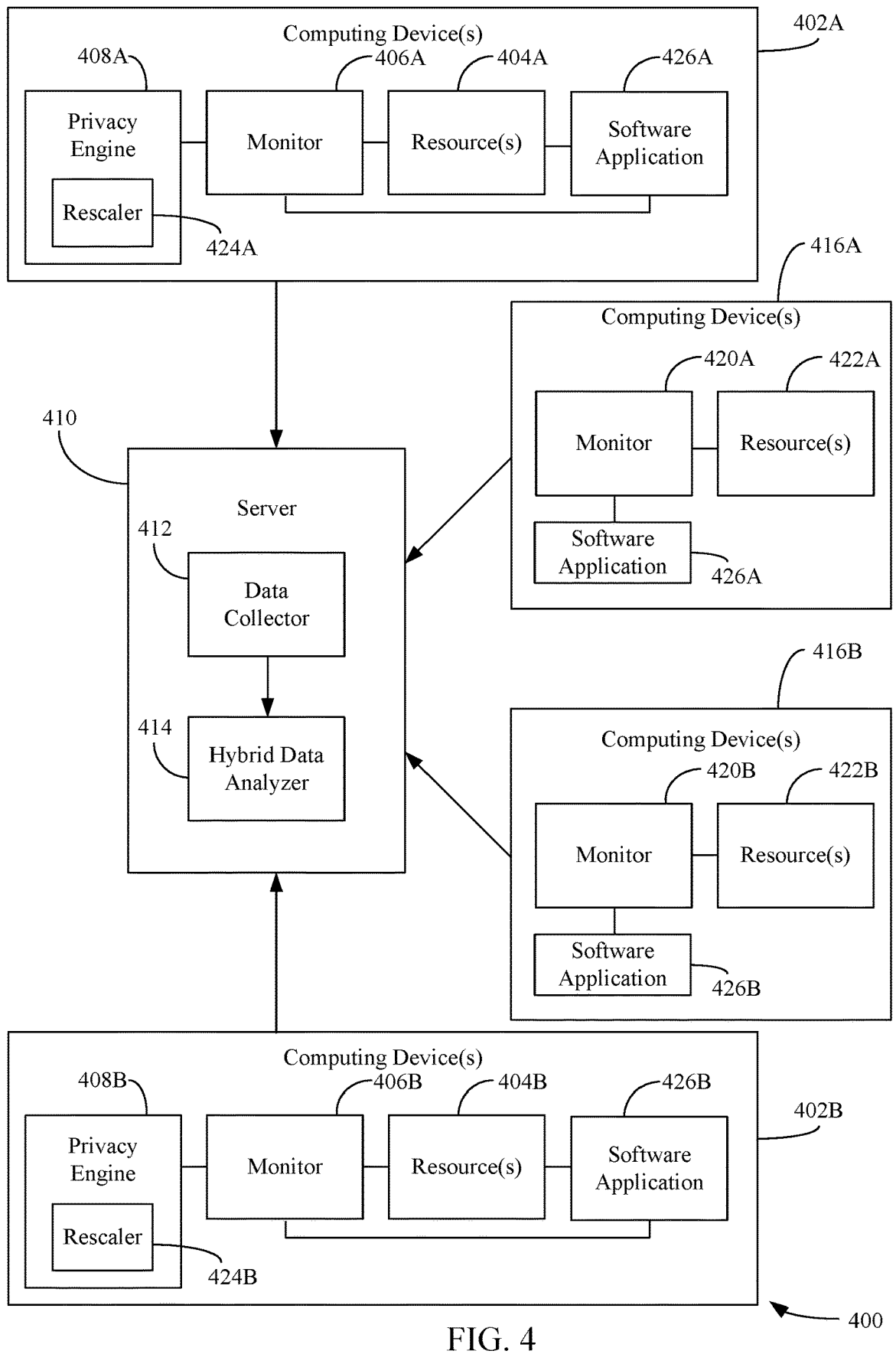
FIG. 4 depicts a block diagram of a system for remotely analyzing testing results that are based on a combination of privatized and non-privatized data in accordance with an example embodiment.

The transformation-based LDP test may be extended for a population with hybrid privacy requirements, where some users require LDP while others are willing to provide non-privatized data. For example, FIG. 4 is a block diagram of a system 400 for remotely analyzing testing results that are based on a combination of privatized and non-privatized data in accordance with embodiments described herein. As shown in FIG. 4, system 400 includes one or more computing devices 402A, one or more computing devices 402B, one or more computing devices 416A, one or more computing devices 416B, and a server 410. Computing device(s) 402A and computing device(s) 416A may be utilized by user(s) of a first population A (corresponding to a control group), and computing device(s) 402B and computing device(s) 416B may be utilized by user(s) of a second population B (corresponding to a treatment group) for which features of a software application are tested. Computing device(s) 402A and computing device 416A may be configured to execute a first version (e.g., version A) of a software application 426A that includes a particular feature being tested (e.g., A/B tested), and computing device(s) 402B and computing device(s) 416B may be configured to execute a second version of the software application (shown as software application 426B) that does not include the particular feature or includes a different version of the feature or includes a difference feature. Alternatively, computing device(s) 402A and 416A and computing device(s) 402B and 416B may be configured to execute the same version of the software application (i.e., software application 426A and software application 426B are the same version).

Each of computing devices 402A also includes one or more resources 404A, a monitor 406A, and a privacy engine 408A, and each of computing devices 402B includes one or more resources 404B, a monitor 406B, and a privacy engine 408B. Each of computing devices 416A are also configured to include one or more resources 422A and a monitor 420A, and each of computing devices 416B are also configured to include one or more resources 422B and a monitor 420B. Each of resource(s) 404A, resource(s) 404B, resource(s) 422A and resource(s) 422B are examples of resource(s) 104A and resource(s) 104B, as described above with reference to FIG. 1. Each of monitor 406A, monitor 406B, monitor 420A and monitor 420B are examples of and monitor 106A and monitor 106B as described above with reference to FIG. 1. Accordingly, monitor 406A is configured to monitor resource(s) 404A, monitor 406B is configured to monitor resource(s) 404B, monitor 420A is configured to monitor resource(s) 422A and monitor 420B is configured to monitor resource(s) 422B.

Privacy engine 408A is configured to privatize monitored data received from monitor 406A, and privacy engine 408B is configured to private monitored data received from monitor 406B. Privacy engine 408A and privacy engine 408B may be configured to privatize the data in accordance with an LDP policy as described above with reference to Subsection A. In particular, privacy engine 408A and privacy engine 408B generate a noise-injected one-bit value representative of the measured data and provide the noise-injected one-bit value to server 410. Computing device(s) 416A and computing device(s) 416B are configured to transmit data that has not been privatized (i.e., non-privatized data) to server 410 (i.e., the actual value of the data being monitored (e.g., a counter value) is transmitted).

To enable the privatized data to be analyzed in combination with the non-privatized data, each of privacy engine 408A and privacy engine 408B may be configured to rescale the privatized data before transmitting the privatized data to server 410. For instance, privacy engine 408A includes a rescaler 424A, and privacy engine 408B includes a rescaler 424B. Each of rescaler 424A and rescaler 424B may be configured to rescale the noise-injected one-bit values to generate rescaled noise-injected one-bit values. For example, rescaler 424A rescales the noise-injected one-bit values in accordance with Equation 18, which is shown below:

$$a_i^{mix} = \begin{cases} -m/(e^\varepsilon - 1), & M_{\varepsilon,m(a_i)} = 0 \\ me^\varepsilon/(e^\varepsilon - 1), & M_{\varepsilon,m(a_i)} = 1 \end{cases} \quad \text{(Equation 18)}$$

where $a_i^{mix}$ represents the noise-injected data transmitted to server 410 from each of computing device(s) 402A. In other words, if the noise-injected one-bit value is 0 (i.e., $M_{\varepsilon,m(a_i)}=0$), the noise-injected one-bit value sent to server 410 is rescaled in accordance with $-m/(e^\varepsilon-1)$. Conversely, if the noise-injected one-bit value is 1 (i.e., $M_{\varepsilon,m(a_i)}=1$), the noise-injected one-bit value sent to server 410 is rescaled in accordance with $me^\varepsilon/(e^\varepsilon-1)$.

Similarly, rescaler 424B rescales the noise-injected one-bit values in accordance with Equation 19, which is shown below:

$$b_i^{mix} = \begin{cases} -m/(e^\varepsilon - 1), & M_{\varepsilon,m(b_i)} = 0 \\ me^\varepsilon/(e^\varepsilon - 1), & M_{\varepsilon,m(b_i)} = 1 \end{cases} \quad \text{(Equation 19)}$$

where $b_i^{mix}$ represents the noise-injected data transmitted to server 410 from each of computing device(s) 402B. In other words, if the noise-injected one-bit value is 0 (i.e., $M_{\varepsilon,m(b_i)}=0$), the noise-injected one-bit value sent to server 410 is rescaled in accordance with to $-m/(e^\varepsilon-1)$. Conversely, if the noise-injected one-bit value is 1 (i.e., $M_{\varepsilon,m(b_i)}=1$), the noise-injected one-bit value sent to server 410 is rescaled in accordance with $me^\varepsilon/(e^\varepsilon-1)$.

Because computing device(s) 416A and computing device(s) 416B are configured to transmit non-privatized data, the data transmitted by computing device(s) 416A may be represented as $a_i^{mix}=a_i$, and the data transmitted by computing device(s) 416B may be represented as $b_i^{mix}=b_i$.

Server 410 comprises data collector 412 and a hybrid data analyzer 414. Data collector 412 is configured receive privatized data from computing device(s) 402A and computing device(s) 402B and non-privatized data from computing device(s) 416A and computing device(s) 416B. The privatized and non-privatized data may be received via a network. The network may comprise one or more networks such as local area networks (LANs), wide area networks (WANs), enterprise networks, the Internet, etc., and may include one or more of wired and/or wireless portions. The privatized data and the non-privatized data received from computing device(s) 402A and computing device(s) 416A may be collectively represented as $A^{mix}=\{a_i^{mix}\}$, and the privatized data and the non-privatized data received from computing device(s) 402B and computing device(s) 416B may be collectively represented as $B^{mix}=\{b_i^{mix}\}$. Data collector 412 provides the collected data to hybrid data analyzer 414.

Hybrid data analyzer 414 is configured to perform a hypothesis test ($T_\varepsilon^{mix}$) that analyzes the received privatized one-bit values and non-privatized values received from computing device(s) 402A and 416A and computing device(s) 402B and 416B to determine the effect of the difference between software application 426A and software application 426B.

For example, as shown in FIG. 4, hybrid data analyzer 414 is configured to calculate a first mean $\mu_A^{mix}$ that is based on the combination of the privatized one-bit values received from computing device(s) 402A and the non-privatized one-bit values received from computing device(s) 416A (i.e., $A^{mix}$), and calculate a second mean $\mu_B^{mix}$ that is based on the combination of the privatized one-bit values received from computing device(s) 402B and the non-privatized one-bit values received from computing device(s) 416B (i.e., $B^{mix}$).

Hybrid data analyzer 414 conducts a statistical test based on a null hypothesis at a significance level $\alpha$. The null hypothesis is shown below in Equation 20:

$$H_0^{mix}: \mu_A^{mix}-\mu_B^{mix}=d_0 \quad \text{(Equation 20)}$$

It has been shown that the distribution of the privatized data received from computing device 402A in combination with the non-privatized data received from computing device 416A and the distribution of the privatized data received from computing device(s) 402B in combination with the non-privatized data received from computing device(s) 416B have the same means as the true (or actual) means of the non-privatized data received from computing device(s) 416A and the non-privatized data received from computing device(s) 416A, respectively. That is, $A^{mix}$ and $B^{mix}$ received by server 410 can be considered as being drawn from distributions $A^{mix}$ and $B^{mix}$, with $\mu_A^{mix}=\mu_A$ and $\mu_B^{mix}=\mu_B$, respectively, but having higher variances.

Accordingly, the null hypothesis $H_0$ is accepted (or rejected) if and only if $H_0^{mix}$ is accepted (or rejected). In accordance with an embodiment, the statistical test performed by hybrid data analyzer 414 is t-test. In accordance with another embodiment, the statistical test is a Z-test in lieu of if populations follow Normal distributions. It is noted that hybrid data analyzer 414 may use any parameterized test may be used in addition to or in lieu of t-tests and Z-tests. It is further noted that the foregoing techniques can be extended for scenarios where each computing device i requires a different privacy budget $\varepsilon_i$.

Figure 5:
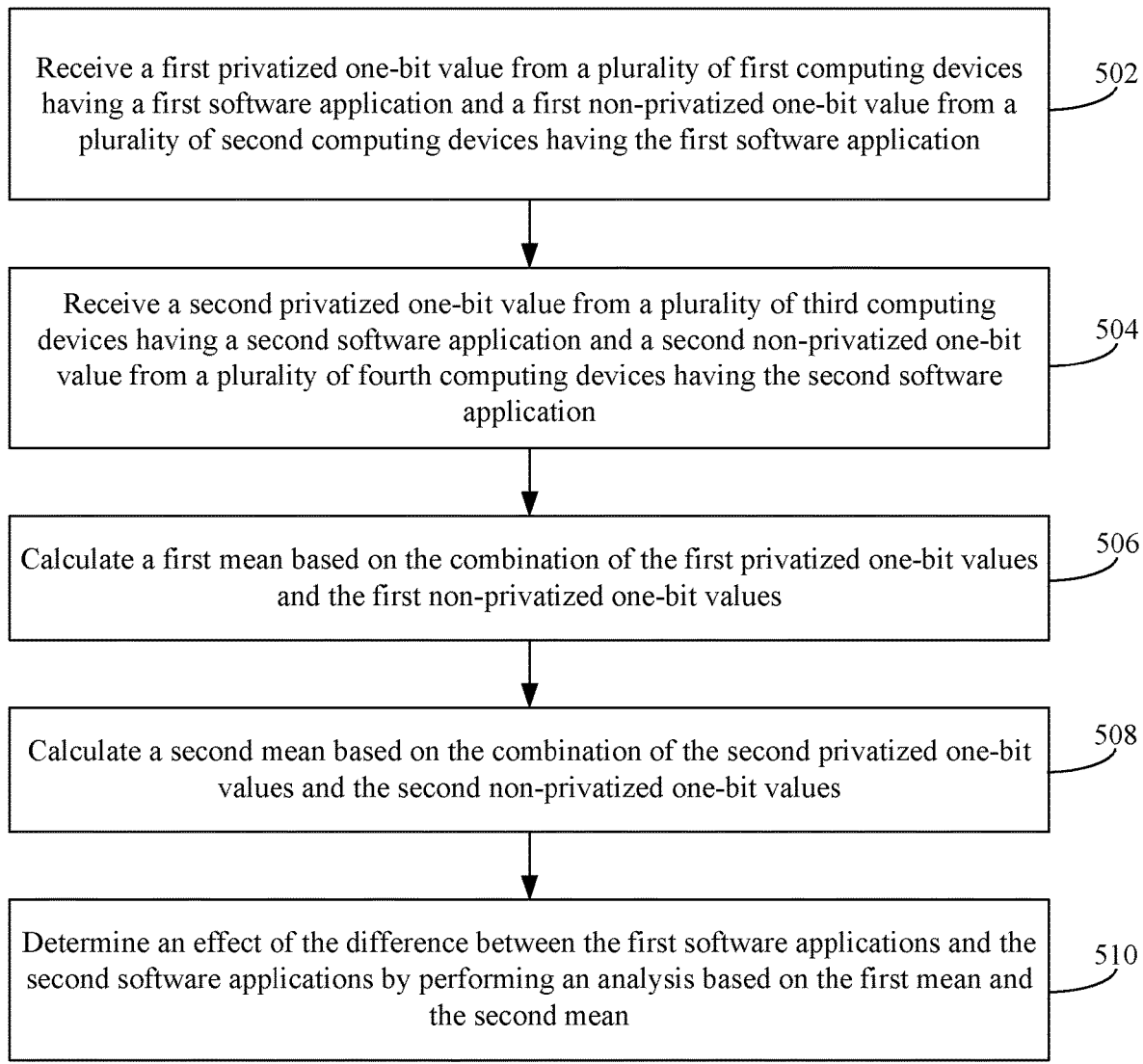
FIG. 5 depicts a flowchart of an example method for remotely analyzing hybrid testing results in accordance with an example embodiment.

Accordingly, a hybrid data may be remotely analyzed to determine an effect of a software application being tested many ways. For example, FIG. 5 depicts a flowchart 500 of an example method for remotely analyzing hybrid testing results in accordance with an example embodiment. The method of flowchart 500 will now be described with continued reference to system 400 of FIG. 4, although the method is not limited to that implementation. Other structural and operational embodiments will be apparent to persons skilled in the relevant art(s) based on the discussion regarding flowchart 500 and system 400 of FIG. 4.

As shown in FIG. 5, the method of flowchart 500 begins at step 502, in which a first privatized one-bit value is received from each of a plurality of first computing devices having a first software application and a first non-privatized one-bit value is received from a plurality of second computing devices having the first software application. Each first privatized value is representative of a measured value that corresponds to usage of a resource of the first computing device from which it was received, and each first non-privatized one-bit value is representative of a measured value that corresponds to usage of a resource of the second computing device from which it was received. The first privatized one-bit value and the first non-privatized one-bit value are received by a computer-implemented data collector via a network. For example, with reference to FIG. 1, data collector 412 receives a first privatized one-bit value from each of computing device(s) 402A having software application 426A and receives a first non-privatized one-bit value from each of computing device(s) 416A having software application 426A. The first privatized one-bit value represents a measured value (e.g., a counter) that corresponds to a usage of resource(s) 404A, and the first non-privatized one-bit value represents a measured value that corresponds to a usage of resource(s) 422A.

At step 504, a second privatized one-bit value is received from each of a plurality of third computing devices having a second software application and a second non-privatized one-bit value is received from a plurality of fourth computing devices having the second software application. Each second privatized value is representative of a measured value that corresponds to usage of a resource of the third computing device from which it was received, and each second non-privatized one-bit value is representative of a measured value that corresponds to usage of a resource of the fourth computing device from which it was received. The second privatized one-bit value and the second non-privatized one-bit value are received by the computer-implemented data collector via the network. The first software applications are different with respect to the second software applications in terms of at least one user or at least one feature. For example, with reference to FIG. 4, data collector 412 receives a second privatized one-bit value from each of computing device(s) 402B having software application 426B and receives a second non-privatized one-bit value from each of computing device(s) 416B having software application 426B. The second privatized one-bit value represents a measured value (e.g., a counter) that corresponds to a usage of resource(s) 404B, and the second non-privatized one-bit value represents a measured value that corresponds to a usage of resource(s) 422B.

In accordance with one or more embodiments, the first privatized one-bit values and the second privatized one-bit values are noise-injected in accordance with a LDP policy. For example, with reference to FIG. 1, privacy engine 408A applies an LDP policy to noise-inject the first privatized one-bit values, and privacy engine 408B applies an LDP policy to noise-inject the second privatized one-bit values.

In accordance with one or more embodiments, a distribution of the first privatized one-bit values in combination with the first non-privatized one-bit values has the same means as the true means of the measured values of the plurality of first computing devices and the plurality of second computing devices, and a distribution of the second privatized one-bit values in combination with the second non-privatized one-bit values have the same means as the true means of the measured values of the plurality of third computing devices and the plurality of fourth computing devices, respectively.

In accordance with one or more embodiments, the resources of the first computing devices (e.g., computing device(s) 402A), the resources of the second computing devices (e.g., computing device(s) 416A), the resources of the third computing devices (e.g., computing device(s) 402B) or the resources of the fourth computing devices (e.g., computing device(s) 416B) comprise a software application or features thereof, an operating system or features thereof, a processor, a memory, at least one of input/output (I/O) ports or I/O devices, a sensor, network bandwidth, or a power source.

At step 506, a first mean is calculated based on the combination of the first privatized one-bit values and the first non-privatized one-bit values. For example, with reference to FIG. 4, hybrid data analyzer 414 calculates a first mean based on the first privatized one-bit values and the first non-privatized one-bit values. The first mean may be calculated in accordance with Equation 9, as described above.

At step 508, a second mean is calculated based on the combination of the second privatized one-bit values and the second non-privatized one-bit values. For example, with reference to FIG. 4, hybrid data analyzer 414 calculates a second mean based on the second privatized one-bit values and the second non-privatized one-bit values. The second mean may be calculated in accordance with Equation 9, as described above.

At step 510, an effect of the difference between the first software applications and the second software applications is determined by performing an analysis based on the first mean and the second mean. For example, with reference to FIG. 5, hybrid data analyzer 414 determines an effect of the difference between the first software applications (e.g., software application 426A) and the second software applications (e.g., software application 426B) by performing an analysis based on the first mean and the second mean.

In accordance with one or more embodiments, the effect of the difference is output to a user of server 410 (or a computing device communicatively coupled thereto) so that he or she can observe the effect and potentially take action on it (e.g., make modifications to the software application being tested (e.g., software application 426A and/or software application 426B) in order to provide a more desired effect). The effect may be displayed via a graphical user interface (GUI), provided via an automatically-generated report, etc.

In accordance with one or more embodiments, a statistical test is performed with a null hypothesis that is based on a difference between the first mean and the second mean. For example, with reference to FIG. 4, hybrid data analyzer 414 performs the analysis by performing a statistical test with the null hypothesis described above with reference to Equation 20.

In accordance with one or more embodiments, the statistical test is at least one of a t-test, a Z-test or a statistical hypothesis test that is configured to compare two population means.

In accordance with one or more embodiments, a number of the plurality of first computing devices from which the first privatized one-bit values are received, a number of the plurality of second computing devices from which the first privatized one-bit values are received, a number of the plurality of third computing devices from which the second privatized one-bit values are received, and a number of the plurality of fourth computing devices from which the second non-privatized one-bit values are received are determined based on a predetermined significance level representing a probability of falsely rejecting the null hypothesis when it is true, a statistical power representing a probability of failing to reject the null hypothesis when it is true, and an effect size that represents a desired measure of the effect of the software application feature. For example, with reference to FIG. 1, hybrid data analyzer 414 determines a number of first computing device(s) 402A from which the first privatized one-bit values are received, a number of second computing device(s) 416A from which the first non-privatized one-bit values are received, a number of second computing device(s) 402B from which the second privatized one-bit values are received, and a number of fourth computing device(s) 416B from which the second non-privatized one-bit values are received in accordance with Equation 15.

III. Example Computer System Implementation

Computing device(s) 102A, computing device(s) 102B, server 110, privacy engine 108A, privacy engine 108B, monitor 106A, monitor 106B, resource(s) 104A, resource(s) 104B, software application 120A, software application 120B, data collector 112, data analyzer 114, transformation-based data analyzer 116, and estimation-based data analyzer 118 of FIG. 1, computing device(s) 402A, computing device(s) 402B, computing device(s) 416A, computing device(s) 416B, server 410, privacy engine 408A, privacy engine 408B, monitor 406A, monitor 406B, monitor 420A, monitor 420B, resource(s) 404A, resource(s) 404B, resource(s) 422A, resource(s) 422B, software application 426A, software application 426B, rescaler 424A, rescaler 424B, data collector 412, and hybrid data analyzer 414 of FIG. 4, flowchart 200 of FIG. 2, flowchart 300 of FIG. 3 and/or flowchart 500 of FIG. 5, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 6:
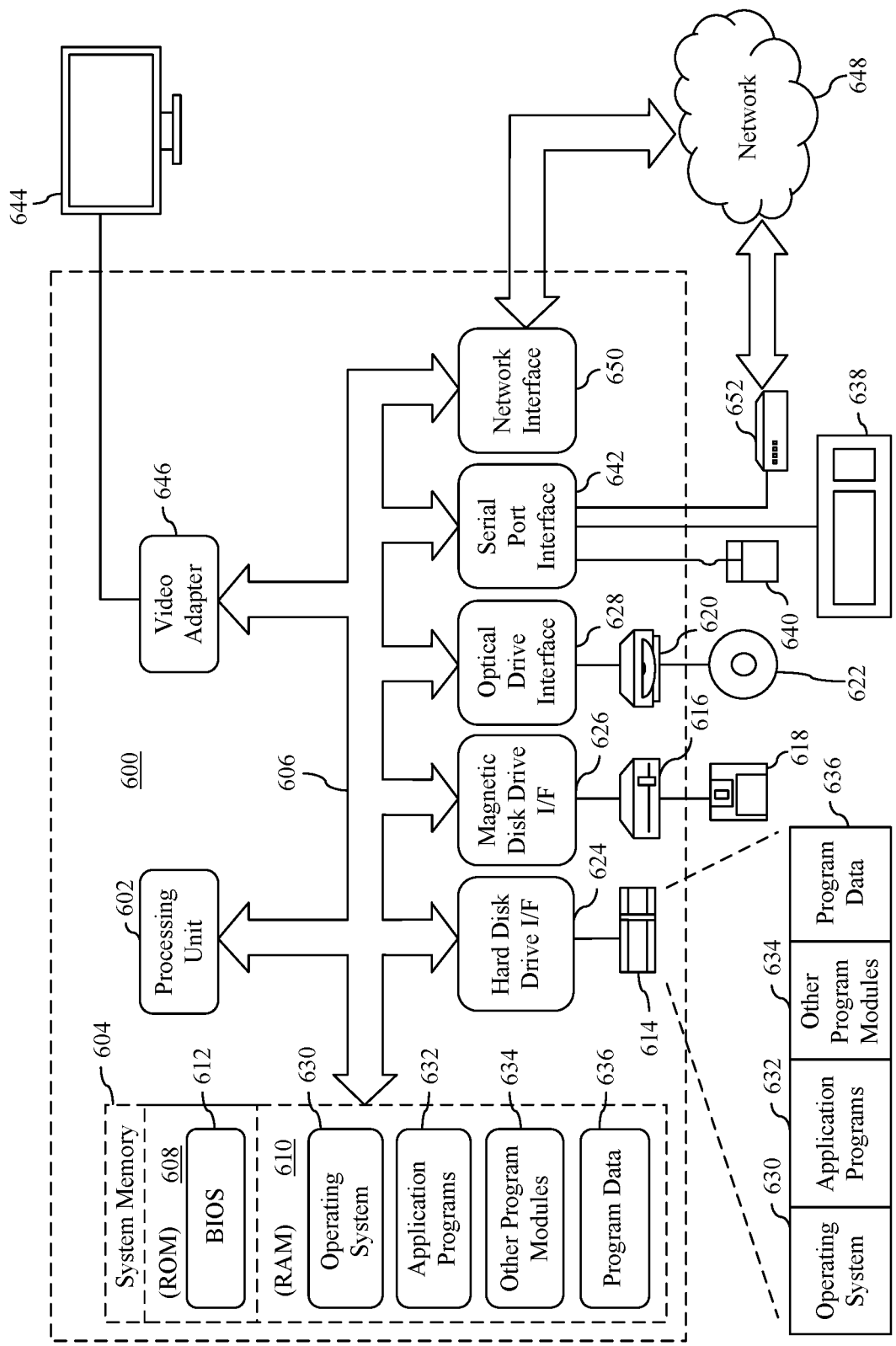
FIG. 6 is a block diagram of an example computing device that may be used to implement embodiments.

FIG. 6 depicts an example processor-based computer system 600 that may be used to implement various embodiments described herein. For example, system 600 may be used to implement computing device(s) 102A, computing device(s) 102B, server 110, computing device(s) 402A, computing device(s) 402B, computing device(s) 416A, computing device(s) 416B and/or server 410, as described above in reference to FIGS. 1 and 4. System 600 may also be used to implement any of the steps of any of the flowcharts of FIGS. 2, 3 and 5, as described above. The description of system 600 provided herein is provided for purposes of illustration, and is not intended to be limiting. Embodiments may be implemented in further types of computer systems, as would be known to persons skilled in the relevant art(s).

As shown in FIG. 6, system 600 includes a processing unit 602, a system memory 604, and a bus 606 that couples various system components including system memory 604 to processing unit 602. Processing unit 602 may comprise one or more circuits (e.g. processor circuits), microprocessors or microprocessor cores. Bus 606 represents one or more of any of several types of bus structures, including a memory bus or memory controller, a peripheral bus, an accelerated graphics port, and a processor or local bus using any of a variety of bus architectures. System memory 604 includes read only memory (ROM) 608 and random access memory (RAM) 610. A basic input/output system 612 (BIOS) is stored in ROM 608.

System 600 also has one or more of the following drives: a hard disk drive 614 for reading from and writing to a hard disk, a magnetic disk drive 616 for reading from or writing to a removable magnetic disk 618, and an optical disk drive 620 for reading from or writing to a removable optical disk 622 such as a CD ROM, DVD ROM, BLU-RAY™ disk or other optical media. Hard disk drive 614, magnetic disk drive 616, and optical disk drive 620 are connected to bus 606 by a hard disk drive interface 624, a magnetic disk drive interface 626, and an optical drive interface 628, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 630, one or more application programs 632, other program modules 634, and program data 636. In accordance with various embodiments, the program modules may include computer program logic that is executable by processing unit 602 to perform any or all of the functions and features of computing device(s) 102A, computing device(s) 102B, server 110, computing device(s) 402A, computing device(s) 402B, computing device(s) 416A, computing device(s) 416B and/or server 410, as described above in reference to FIGS. 1 and 4. The program modules may also include computer program logic that, when executed by processing unit 602, causes processing unit 602 to perform any of the steps of any of the flowcharts of FIGS. 2, 3 and 5, as described above.

A user may enter commands and information into system 600 through input devices such as a keyboard 638 and a pointing device 640 (e.g., a mouse). Other input devices (not shown) may include a microphone, joystick, game controller, scanner, or the like. In one embodiment, a touch screen is provided in conjunction with a display 644 to allow a user to provide user input via the application of a touch (as by a finger or stylus for example) to one or more points on the touch screen. These and other input devices are often connected to processing unit 602 through a serial port interface 642 that is coupled to bus 606, but may be connected by other interfaces, such as a parallel port, game port, or a universal serial bus (USB). Such interfaces may be wired or wireless interfaces.

Display 644 is connected to bus 606 via an interface, such as a video adapter 646. In addition to display 644, system 600 may include other peripheral output devices (not shown) such as speakers and printers.

System 600 is connected to a network 648 (e.g., a local area network or wide area network such as the Internet) through a network interface 650, a modem 652, or other suitable means for establishing communications over the network. Modem 652, which may be internal or external, is connected to bus 606 via serial port interface 642.

As used herein, the terms "computer program medium," "computer-readable medium," and "computer-readable storage medium" are used to generally refer to memory devices or storage structures such as the hard disk associated with hard disk drive 614, removable magnetic disk 618, removable optical disk 622, as well as other memory devices or storage structures such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 632 and other program modules 634) may be stored on the hard disk, magnetic disk, optical disk, ROM, or RAM. Such computer programs may also be received via network interface 650, serial port interface 642, or any other interface type. Such computer programs, when executed or loaded by an application, enable system 600 to implement features of embodiments discussed herein. Accordingly, such computer programs represent controllers of the system 600. Embodiments are also directed to computer program products comprising software stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to memory devices and storage structures such as RAM, hard drives, floppy disks, CD ROMs, DVD ROMs, zip disks, tapes, magnetic storage devices, optical storage devices, MEMs, nanotechnology-based storage devices, and the like.

Embodiments are also directed to computer program products comprising computer code or instructions stored on any computer-readable medium or computer-readable storage medium. Such computer program products include hard disk drives, optical disk drives, memory device packages, portable memory sticks, memory cards, and other types of physical storage hardware.

IV. Additional Exemplary Embodiments

A method is described herein. The method includes receiving, by a computer-implemented data collector via a network, a first noise-injected one-bit value from each of a plurality of first computing devices having a first software application, each first noise-injected one-bit value being representative of a measured value that corresponds to usage of a resource of the first computing device from which it was received, receiving, by the computer-implemented data collector via the network, a second noise-injected one-bit value from each of a plurality of second computing devices having a second software application, each second noise-injected one-bit value being representative of a measured value that corresponds to usage of a resource of the second computing device from which it was received, the first software applications being different with respect to the second software applications in terms of at least one user or at least one feature, calculating, by a computer-implemented data analyzer, a binomial distribution mean of the first noise-injected one-bit values, calculating, by the computer-implemented data analyzer, a binomial distribution mean of the second noise-injected one-bit values; and determining, by the computer-implemented data analyzer, an effect of the difference between the first software applications and the second software applications by performing an analysis based on the binomial distribution mean of the first noise-injected one-bit values and the binomial distribution mean of the second noise-injected one-bit values.

In an embodiment of the method, the method further comprises: utilizing the determined effect to make at least one of: a design modification to the first software application that reduces the usage of the resource of the first computing device, whereby at least one of a functionality or an efficiency of the first computing device is improved; or a design modification to the second software application that reduces the usage of the resource of the second computing device, whereby at least one of a functionality or an efficiency of the second computing device is improved.

In an embodiment of the method, the resources of the first computing devices or the resources of the second computing devices comprise: a software application or features thereof; an operating system or features thereof; a processor; a memory; at least one of input/output (I/O) ports or I/O devices; a sensor; network bandwidth; or a power source.

In an embodiment of the method, the binomial distribution of the first noise-injected one-bit values and the binomial distribution of the second noise-injected one-bit values have Bernoulli means proportional to the true means of the measured values.

In an embodiment of the method, performing the analysis comprises: performing a statistical test with a null hypothesis that is based on: a difference between the binomial distribution mean of the first noise-injected one-bit values and the binomial distribution mean of the second noise-injected one-bit values, the difference being equivalent to a difference between a first distribution mean of the measured values of the plurality of first computing devices and a second distribution mean of the measured values of the plurality of second computing devices; and a predetermined maximum for the measured values.

In an embodiment of the method, the statistical test is at least one of: a t-test; a Z-test; or a statistical hypothesis test configured to compare two population means.

In an embodiment of the method, a number of the plurality of first computing devices from which the first noise-injected one-bit values are received and a number of the plurality of second computing devices from which the second noise-injected one-bit values are received are determined based on: a predetermined significance level representing a probability of falsely rejecting the null hypothesis when it is true; a statistical power representing a probability of failing to reject the null hypothesis when it is true; and an effect size that represents a desired measure of the effect of the software application feature.

In an embodiment of the method, the statistical power is predetermined and the effect size is determined based on at least the predetermined statistical power.

In an embodiment of the method, the effect size is predetermined and the statistical power is based on at least the predetermined effect size.

A system is also described herein. The system includes at least one processor circuit and at least one memory that stores program code configured to be executed by the at least one processor circuit. The program code includes: a data collector configured to: receive, via a network, a first privatized one-bit value from a plurality of first computing devices having a first software application, each first privatized one-bit value being representative of a measured value that corresponds to usage of a resource of the first computing device from which it was received, and a first non-privatized one-bit value from a plurality of second computing devices having the first software application, each first non-privatized one-bit value being representative of a measured value that corresponds to usage of a resource of the second computing device from which it was received; and receive, via the network, a second privatized one-bit value from a plurality of third computing devices having a second software application, each second privatized one-bit value being representative of a measured value that corresponds to usage of a resource of the third computing device from which it was received, and a second non-privatized one-bit value from a plurality of fourth computing devices having the second software application, each second non-privatized one-bit value being representative of a measured value that corresponds to usage of a resource of the fourth computing device from which it was received, the first software applications being different with respect to the second software applications in terms of at least one user or at least one feature; and a data analyzer configured to: calculate a first mean based on the combination of the first privatized one-bit values and the first non-privatized one-bit values; calculate a second mean based on the combination of the second privatized one-bit values and the second non-privatized one-bit values; and determine an effect of the difference between the first software applications and the second software applications by performing an analysis based on the first mean and the second mean.

In an embodiment of the system, a distribution of the first privatized one-bit values in combination with the first non-privatized one-bit values has the same means as the true means of the measured values of the plurality of first computing devices and the plurality of second computing devices, and wherein a distribution of the second privatized one-bit values in combination with the second non-privatized one-bit values have the same means as the true means of the measured values of the plurality of third computing devices and the plurality of fourth computing devices, respectively.

In an embodiment of the system, the resources of the first computing devices, the resources of the second computing devices, the resources of the third computing devices, or the resources of the fourth computing devices comprise: a software application or features thereof; an operating system or features thereof; a processor; a memory; at least one of input/output (I/O) ports or I/O devices; a sensor; network bandwidth; or a power source.

In an embodiment of the system, performing the analysis comprises: performing a statistical test with a null hypothesis that is based on a difference between the first mean and the second mean.

In an embodiment of the system, the statistical test is at least one of: a t-test; a Z-test; or a statistical hypothesis test that is configured to compare two population means.

In an embodiment of the system, a number of the plurality of first computing devices from which the first privatized one-bit values are received, a number of the plurality of second computing devices from which the non-privatized one-bit values are received, a number of the plurality of third computing devices from which the second privatized one-bit values are received, and a number of the plurality of fourth computing devices from which the second non-privatized one-bit values are received are determined based on: a predetermined significance level representing a probability of falsely rejecting the null hypothesis when it is true; a statistical power representing a probability of failing to reject the null hypothesis when it is true; and an effect size that represents a desired measure of the effect of the software application feature.

In an embodiment of the system, the first privatized one-bit values and the second privatized one-bit values are rescaled based on a predetermined maximum value of the measured value.

A computer-readable storage medium having program instructions recorded thereon that, when executed by at least one processor, perform a method for determining an effect of a software application feature is further described herein. The method includes: receiving via a network a first noise-injected two-bit value from each of a plurality of first computing devices having a first software application, each first noise-injected two-bit value being representative of a measured value that corresponds to usage of a resource of the first computing device from which it was received; receiving via the network a second noise-injected two-bit value from each of a plurality of second computing devices having a second software application, each second noise-injected two-bit value being representative of a measured value that corresponds to usage of a computing resource of the second computing device from which it was received, the first software applications being different with respect to the second software applications in terms of at least one user or at least one feature; calculating a first sample mean based on a first bit of the first noise-injected two-bit values; calculating a first sample variance based on a second bit of the first noise-injected two-bit values; calculating a second sample mean based on a first bit of the second noise-injected two-bit values; calculating a second sample variance based on a second bit of the second noise-injected two-bit values; and determining an effect of the difference between the first software applications and the second software applications by performing an analysis based on the first sample mean, the second sample mean, the first sample variance, and the second sample variance.

In an embodiment of the computer-readable storage medium, the resources of the first computing devices or the resources of the second computing devices comprise: a software application or features thereof; an operating system or features thereof; a processor; a memory; at least one of input/output (I/O) ports or I/O devices; a sensor; network bandwidth; or a power source.

In an embodiment of the computer-readable storage medium, the method further comprises: determining a test statistic and degrees of freedoms in which the test statistic can vary based on the first sample mean, the second sample mean, the first sample variance, and the second sample variance; and performing the analysis comprises: performing a statistical test with a null hypothesis that is based on the test statistic and the degrees of freedom.

In an embodiment of the computer-readable storage medium, a number of the plurality of first computing devices from which the first noise-injected two-bit values are received and a number of the plurality of second computing devices from which the second noise-injected two-bit values are received are determined based on: a predetermined significance level representing a probability of falsely rejecting the null hypothesis when it is true; a statistical power representing a probability of failing to reject the null hypothesis when it is true; and an effect size that represents a desired measure of the effect of the software application feature.

V. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A method, comprising:
receiving, by a computer-implemented data collector via a network, a first noise-injected one-bit value from each of a plurality of first computing devices having a first software application, each first noise-injected one-bit value being representative of a measured value that corresponds to usage of a resource of the first computing device from which it was received;
receiving, by the computer-implemented data collector via the network, a second noise-injected one-bit value from each of a plurality of second computing devices having a second software application, each second noise-injected one-bit value being representative of a measured value that corresponds to usage of a resource of the second computing device from which it was received, the first software applications being different with respect to the second software applications in terms of at least one user or at least one feature;
calculating, by a computer-implemented data analyzer, a binomial distribution mean of the first noise-injected one-bit values;
calculating, by the computer-implemented data analyzer, a binomial distribution mean of the second noise-injected one-bit values;
performing an analysis based on the binomial distribution mean of the first noise-injected one-bit values and the binomial distribution mean of the second noise-injected one-bit values; and
determining, by the computer-implemented data analyzer, an effect of the difference between the first software applications and the second software applications based on the analysis.

2. The method of claim 1, further comprising:
utilizing the determined effect to make at least one of:
a design modification to the first software application that reduces the usage of the resource of the first computing device, whereby at least one of a functionality or an efficiency of the first computing device is improved; or
a design modification to the second software application that reduces the usage of the resource of the second computing device, whereby at least one of a functionality or an efficiency of the second computing device is improved.

3. The method of claim 1, wherein the resources of the first computing devices or the resources of the second computing devices comprise:
a software application or features thereof;
an operating system or features thereof;
a processor;
a memory;
at least one of input/output (I/O) ports or I/O devices;
a sensor;
network bandwidth; or
a power source.

4. The method of claim 1, wherein the binomial distribution of the first noise-injected one-bit values and the binomial distribution of the second noise-injected one-bit values have Bernoulli means proportional to the true means of the measured values.

5. The method of claim 1, wherein performing the analysis comprises:
performing a statistical test with a null hypothesis that is based on:
a difference between the binomial distribution mean of the first noise-injected one-bit values and the binomial distribution mean of the second noise-injected one-bit values, the difference being equivalent to a difference between a first distribution mean of the measured values of the plurality of first computing devices and a second distribution mean of the measured values of the plurality of second computing devices; and
a predetermined maximum for the measured values.

6. The method of claim 5, wherein the statistical test is at least one of:
a t-test;
a Z-test; or
a statistical hypothesis test configured to compare two population means.

7. The method of claim 5, wherein a number of the plurality of first computing devices from which the first noise-injected one-bit values are received and a number of the plurality of second computing devices from which the second noise-injected one-bit values are received are determined based on:
a predetermined significance level representing a probability of falsely rejecting the null hypothesis when it is true;
a statistical power representing a probability of failing to reject the null hypothesis when it is true; and
an effect size that represents a desired measure of the effect of the software application feature.

8. The method of claim 7, wherein the statistical power is predetermined and the effect size is determined based on at least the predetermined statistical power.

9. The method of claim 7, wherein the effect size is predetermined and the statistical power is based on at least the predetermined effect size.

10. A system, comprising:
at least one processor circuit; and
at least one memory that stores program code configured to be executed by the at least one processor circuit, the program code comprising:
a data collector configured to:
receive, via a network, a first privatized one-bit value from a plurality of first computing devices having a first software application, each first privatized one-bit value being representative of a measured value that corresponds to usage of a resource of the first computing device from which it was received, and a first non-privatized one-bit value from a plurality of second computing devices having the first software application, each first non-privatized one-bit value being representative of a measured value that corresponds to usage of a resource of the second computing device from which it was received; and
receive, via the network, a second privatized one-bit value from a plurality of third computing devices having a second software application, each second privatized one-bit value being representative of a measured value that corresponds to usage of a resource of the third computing device from which it was received, and a second non-privatized one-bit value from a plurality of fourth computing devices having the second software application, each second non-privatized one-bit value being representative of a measured value that corresponds to usage of a resource of the fourth computing device from which it was received, the first software applications being different with respect to the second software applications in terms of at least one user or at least one feature; and a data analyzer configured to:
calculate a first mean based on the combination of the first privatized one-bit values and the first non-privatized one-bit values;
calculate a second mean based on the combination of the second privatized one-bit values and the second non-privatized one-bit values;
performing an analysis based on the first mean and the second mean; and
determine an effect of the difference between the first software applications and the second software applications based on the analysis.

11. The system of claim 10, wherein a distribution of the first privatized one-bit values in combination with the first non-privatized one-bit values has the same means as the true means of the measured values of the plurality of first computing devices and the plurality of second computing devices, and wherein a distribution of the second privatized one-bit values in combination with the second non-privatized one-bit values have the same means as the true means of the measured values of the plurality of third computing devices and the plurality of fourth computing devices, respectively.

12. The system of claim 10, wherein the resources of the first computing devices, the resources of the second computing devices, the resources of the third computing devices, or the resources of the fourth computing devices comprise:
a software application or features thereof;
an operating system or features thereof;
a processor;
a memory;
at least one of input/output (I/O) ports or I/O devices;
a sensor;
network bandwidth; or
a power source.

13. The system of claim 10, wherein performing the analysis comprises:
performing a statistical test with a null hypothesis that is based on a difference between the first mean and the second mean.

14. The system of claim 13, wherein the statistical test is at least one of:
a t-test;
a Z-test; or
a statistical hypothesis test that is configured to compare two population means.

15. The system of claim 10, wherein a number of the plurality of first computing devices from which the first privatized one-bit values are received, a number of the plurality of second computing devices from which the non-privatized one-bit values are received, a number of the plurality of third computing devices from which the second privatized one-bit values are received, and a number of the plurality of fourth computing devices from which the second non-privatized one-bit values are received are determined based on:
a predetermined significance level representing a probability of falsely rejecting the null hypothesis when it is true;
a statistical power representing a probability of failing to reject the null hypothesis when it is true; and
an effect size that represents a desired measure of the effect of the software application feature.

16. The system of 10, wherein the first privatized one-bit values and the second privatized one-bit values are rescaled based on a predetermined maximum value of the measured value.

17. A computer-readable storage medium having program instructions recorded thereon that, when executed by at least one processor, perform a method for determining an effect of a software application feature, the method comprising:
receiving via a network a first noise-injected two-bit value from each of a plurality of first computing devices having a first software application, each first noise-injected two-bit value being representative of a measured value that corresponds to usage of a resource of the first computing device from which it was received;
receiving via the network a second noise-injected two-bit value from each of a plurality of second computing devices having a second software application, each second noise-injected two-bit value being representative of a measured value that corresponds to usage of a computing resource of the second computing device from which it was received, the first software applications being different with respect to the second software applications in terms of at least one user or at least one feature;
calculating a first sample mean based on a first bit of the first noise-injected two-bit values;
calculating a first sample variance based on a second bit of the first noise-injected two-bit values;
calculating a second sample mean based on a first bit of the second noise-injected two-bit values;
calculating a second sample variance based on a second bit of the second noise-injected two-bit values;
performing an analysis based on the first sample mean, the second sample mean, the first sample variance, and the second sample variance; and
determining an effect of the difference between the first software applications and the second software applications based on the analysis.

18. The computer-readable storage medium of claim 17, wherein the resources of the first computing devices or the resources of the second computing devices comprise:
a software application or features thereof;
an operating system or features thereof;
a processor;
a memory;
at least one of input/output (I/O) ports or I/O devices;
a sensor;
network bandwidth; or
a power source.

19. The computer-readable storage medium of claim 17, wherein the method further comprises:
determining a test statistic and degrees of freedoms in which the test statistic can vary based on the first sample mean, the second sample mean, the first sample variance, and the second sample variance; and
wherein performing the analysis comprises:
performing a statistical test with a null hypothesis that is based on the test statistic and the degrees of freedom.

20. The computer-readable storage medium of claim 19, wherein a number of the plurality of first computing devices from which the first noise-injected two-bit values are received and a number of the plurality of second computing devices from which the second noise-injected two-bit values are received are determined based on:
a predetermined significance level representing a probability of falsely rejecting the null hypothesis when it is true;

a statistical power representing a probability of failing to reject the null hypothesis when it is true; and an effect size that represents a desired measure of the effect of the software application feature.

* * * * *